(12) United States Patent
Buzzard et al.

(10) Patent No.: US 9,719,061 B2
(45) Date of Patent: Aug. 1, 2017

(54) ASSEMBLY FOR SELECTIVELY AERATING A BEVERAGE

(71) Applicant: SULFIGHTER, LLC, Chicago, IL (US)

(72) Inventors: Kyle Buzzard, Chicago, IL (US); Gary Harlan Paulsen, Chicago, IL (US); Keith Daniel Alsberg, Evanston, IL (US); Timothy Wilson Zarki, Joshua Tree, CA (US)

(73) Assignee: SULFIGHTER, LLC, Chicago, IL (US)

( * ) Notice: Subject to any disclaimer, the term of this patent is extended or adjusted under 35 U.S.C. 154(b) by 0 days.

(21) Appl. No.: 15/074,864

(22) Filed: Mar. 18, 2016

(65) Prior Publication Data
US 2016/0271574 A1 Sep. 22, 2016

Related U.S. Application Data

(60) Provisional application No. 62/135,698, filed on Mar. 19, 2015.

(51) Int. Cl.
| | |
|---|---|
| *B01F 3/04* | (2006.01) |
| *C12H 1/07* | (2006.01) |
| *C12G 1/00* | (2006.01) |
| *C12H 1/14* | (2006.01) |
| *B01F 5/00* | (2006.01) |

(52) U.S. Cl.
CPC ........... *C12H 1/063* (2013.01); *B01F 3/0446* (2013.01); *B01F 3/04099* (2013.01); *B01F 3/04503* (2013.01); *B01F 3/04744* (2013.01); *B01F 3/04787* (2013.01); *C12G 1/00* (2013.01);

(Continued)

(58) Field of Classification Search
CPC ............... B01F 3/04099; B01F 3/0446; B01F 3/07787; B01F 3/04808; B01F 2003/04865; B01F 2003/04872
USPC ....... 99/323.1, 277.1, 277.2; 261/74, 76, 94, 261/103, 110
See application file for complete search history.

(56) References Cited

U.S. PATENT DOCUMENTS

| | | |
|---|---|---|
| 6,450,214 B1 | 9/2002 | Dyer et al. |
| 7,841,584 B2 | 11/2010 | Sabadicci et al. |

(Continued)

OTHER PUBLICATIONS

International Search Report and Written Opinion for Application No. PCT/US2016/023172, dated May 27, 2016.

*Primary Examiner* — Reginald L Alexander
(74) *Attorney, Agent, or Firm* — Marshall, Gerstein & Borun LLP

(57) ABSTRACT

Disclosed herein is an assembly for selectively aerating a liquid including a base member a reservoir adapted to receive the liquid. The assembly also includes a support member non-rotatably coupled to the base member and a diverter member coupled to the support member and rotatable between a first diverter position and a second diverter position. The diverter member has at least one primary aperture and at least one secondary aperture. The assembly additionally includes an aerator member non-rotatably secured to the diverter member, the aerator member having an aeration aperture. In the first diverter position, a portion of the liquid in the reservoir flows through the primary aperture. In the second diverter position, a portion of the liquid in the reservoir flows through the secondary aperture, and though the aeration aperture.

20 Claims, 30 Drawing Sheets

(52) U.S. Cl.
CPC ........ *C12H 1/14* (2013.01); *B01F 2005/0017* (2013.01); *B01F 2215/0072* (2013.01)

(56) References Cited

U.S. PATENT DOCUMENTS

| | | |
|---|---|---|
| 8,196,906 B2 | 6/2012 | Benton et al. |
| 8,272,538 B2 | 9/2012 | Weinberg et al. |
| 8,430,023 B2 | 4/2013 | Hynes |
| 8,590,865 B2 * | 11/2013 | Heyman ................. B01F 5/043 261/111 |
| 8,727,324 B2 | 5/2014 | Borden et al. |
| 2010/0025867 A1 | 2/2010 | Benton et al. |
| 2011/0024461 A1 | 2/2011 | Kilduff et al. |
| 2011/0024925 A1 | 2/2011 | Mauffette |
| 2011/0271846 A1 | 11/2011 | Hynes |
| 2012/0111893 A1 | 5/2012 | Luebke |
| 2012/0156338 A1 | 6/2012 | Agarwal et al. |
| 2012/0156345 A1 | 6/2012 | Agarwal et al. |
| 2013/0280374 A1 | 10/2013 | Catelli et al. |
| 2014/0120226 A1 | 5/2014 | Kuru et al. |

* cited by examiner

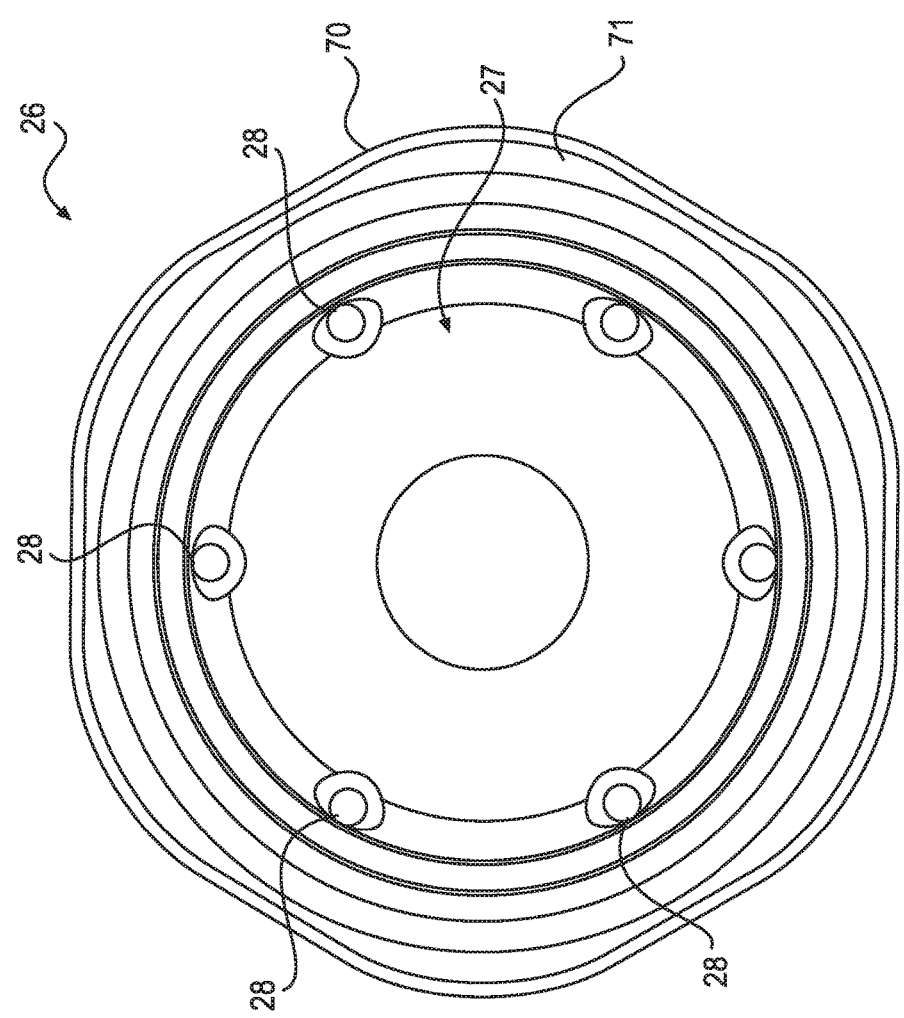

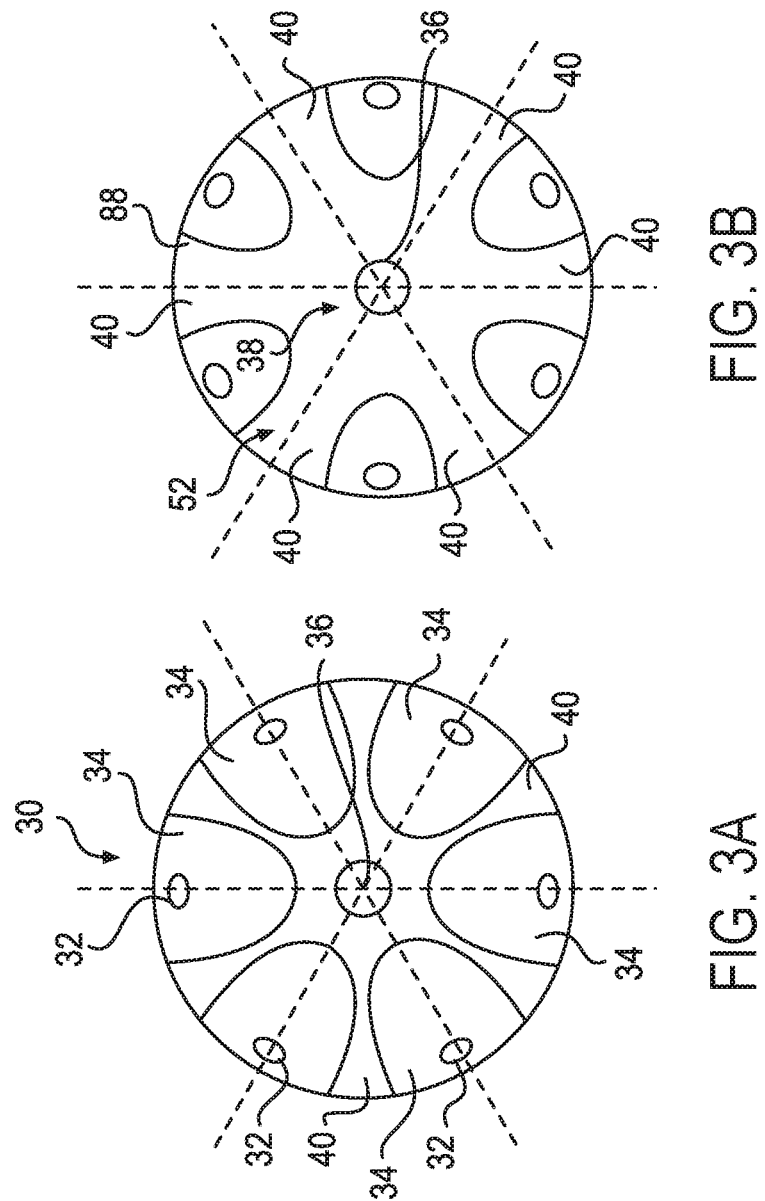

ASSEMBLY FOR SELECTIVELY AERATING A BEVERAGE

FIELD OF THE DISCLOSURE

This disclosure relates generally to beverage aerators.

BACKGROUND

Often, wine is enhanced with entrained air through an aeration device, such as those disclosed in U.S. Pat. Pub. No. US 2012/0156338 A1 and U.S. Pat. No. 7,841,584 B2, which are hereby incorporated by reference. Aerators are used to soften tannins and improve taste but are not capable of eliminating undesirable wine additives, such as preservative sulfites.

Oenophiles generally agree that different wines require different preparative approaches to attain the peak possible experience. Not all wines are enhanced by aerating the wine because too much exposure to oxygen can adversely alter the flavor of the wine.

BRIEF DESCRIPTION OF THE DRAWINGS

FIGS. 2A-2C are various views of embodiments of a support member of the assembly;

FIG. 3A is a top view of an embodiment of a diverter member of the assembly in a first diverter position;

FIG. 3B is a top view of an embodiment of a diverter member of the assembly in a second diverter position;

DETAILED DESCRIPTION

The disclosure provides an assembly for the selective aeration of a liquid, for example a beverage such as wine. Optionally, the assembly can advantageously include a filter pod for the filtering (removal) of a chosen material, such as sulfites.

Figure 1:
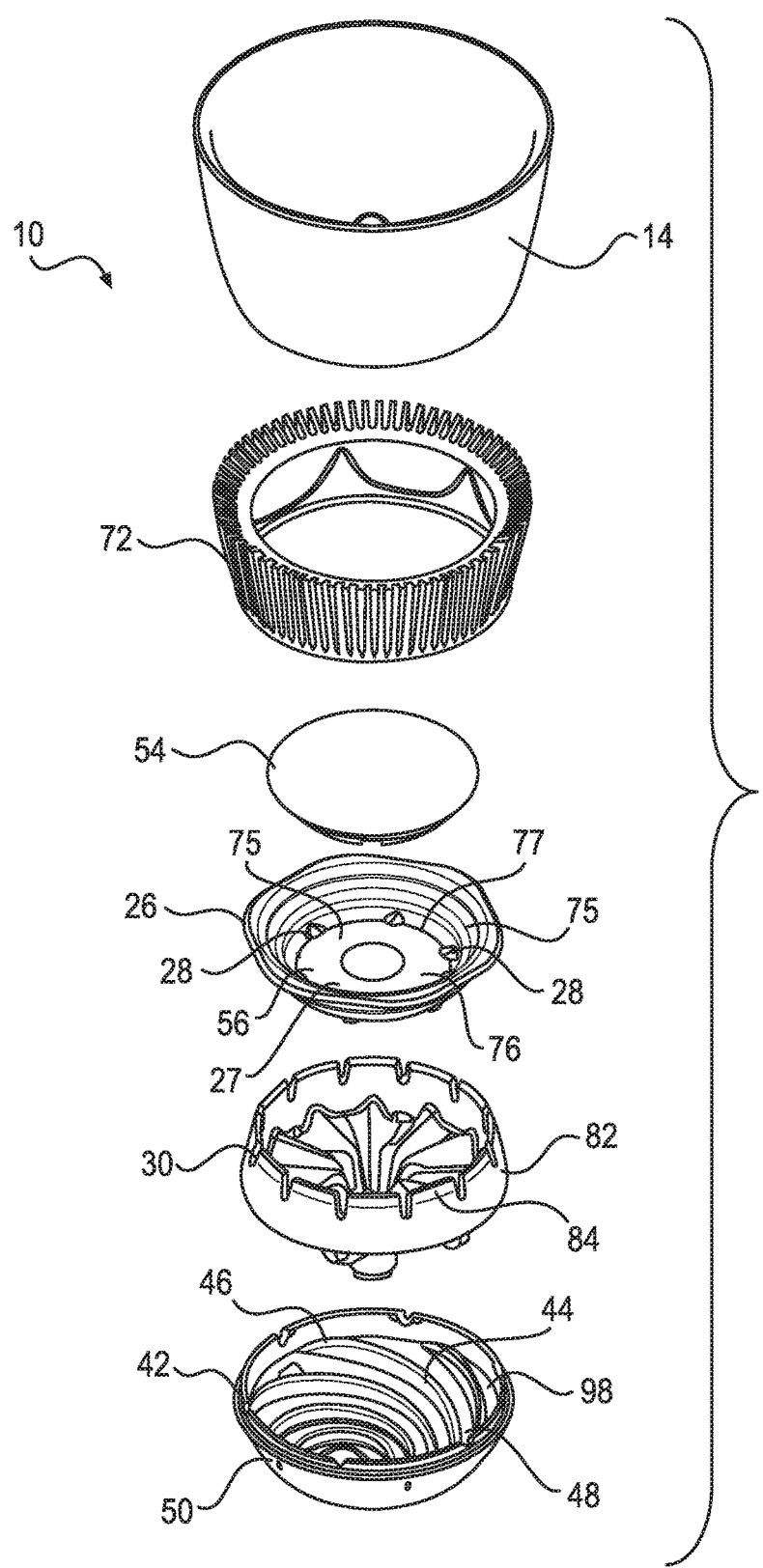
FIG. 1 is an exploded view of an embodiment of an assembly.
Figure 4A:
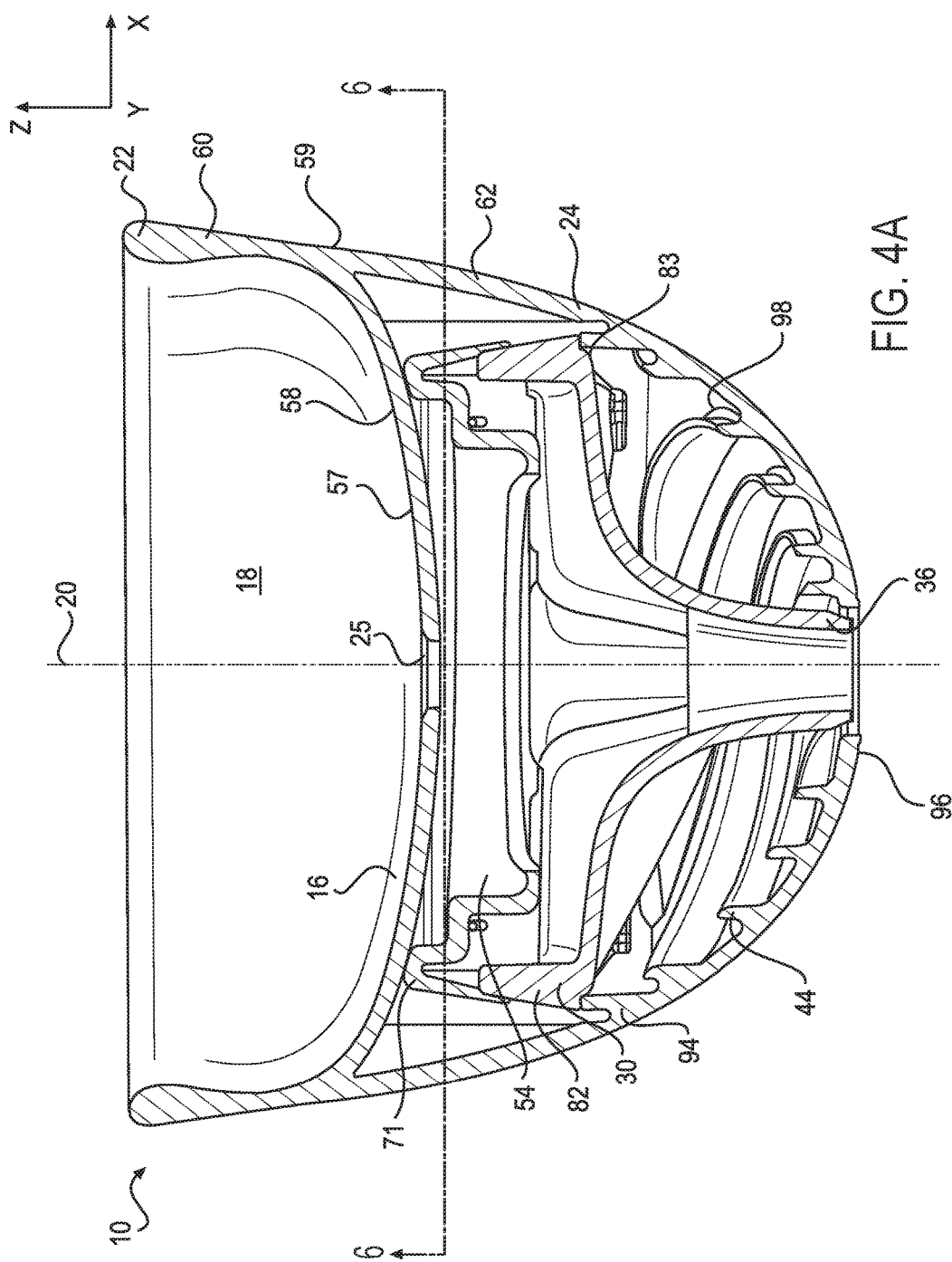
FIG. 4A is a side sectional view of an embodiment of a diverter member of the assembly in a first diverter position.

As illustrated in FIGS. 1 and 4A, an assembly 10 for selectively aerating a liquid (not shown) includes a base member 14 having at least one surface 16 that defines a reservoir 18 adapted to receive the liquid. The base member 14 extends along an assembly axis 20 from an open first end 22 to a second end 24, and the base member 14 having at least one base aperture 25 formed in the surface 16 defining the reservoir 18. The assembly 10 also includes a support member 26 non-rotatably coupled to the base member 14, the support member 26 having at least one support aperture 28 that is in fluid communication with the reservoir 18 of the base member 14. The assembly 10 further includes a diverter member 30 rotatably coupled to the support member 26 and rotatable between a first diverter position (illustrated in FIG. 3A) and a second diverter position (illustrated in FIG. 3B). The diverter member 30 has at least one primary aperture 32 disposed within a trough portion 34, and at least one secondary aperture 36 disposed at a first end 38 of a channel portion 40. The assembly 10 additionally includes an aerator member 42 non-rotatably secured to the diverter member 30, the aerator member 42 having a plurality of raised elongated flow features 44 that each extends from a first end 46 to a second end 48, the aerator member having an aeration aperture 50.

In the first diverter position illustrated in FIG. 3A (in which the support aperture 28 is aligned with a dotted line) and 4B, the at least one support aperture 28 is aligned with the trough portion 34 such that a portion of the liquid in the reservoir 18 flows through the base aperture 25 and into the recess 27 of the support portion 26 and through the support aperture 28 into the trough portion 34, and through the primary aperture 32. The at least one primary aperture 32 is aligned with or adjacent to a portion of the flow feature 44 such that the portion of the liquid flowing through the primary aperture 32 contacts the portion of the flow feature 44 and flows though the aeration aperture 50. In the second diverter position illustrated in FIG. 3B (in which the support aperture 28 is aligned with a dotted line) and 4A, the at least one support aperture 28 is aligned with a second end 52 of the channel portion 40 such that a portion of the liquid in the reservoir 18 flows through the base aperture 25 and into the recess 27 of the support portion 26 and through the support aperture 28, into the channel portion 40 at or adjacent to the second end 52, through the secondary aperture 36, and though the aeration aperture 50.

So configured, a beverage (such as a red wine) may be poured into the reservoir 18 with the diverter member 30 in the first diverter position, and the red wine may be aerated by flowing along the spiraling flow feature(s) 44 before flowing out of the aeration aperture 50 and into a container, such as a carafe or glass. In addition, a beverage (such as a white wine) may be poured into the reservoir 18 with the diverter member 30 in the second diverter position, and the white wine may bypass the aeration provided by the flow feature(s) 44 and flow directly out of the aeration aperture 50 and into a container, such as a carafe or glass. In addition, the beverage (either white or red wine) may flow through a filter pod 54 placed on a top surface 56 of the support member 26 before flowing into or through the support aperture 28, thereby filtering the beverage of a chosen material, such as sulfites.

Turning to the assembly 10 in more detail, and referring to FIG. 4A, the base member 14 extends along the assembly axis 20 from the open first end 22 to a second end 24 that is opposite the first end 22. At least one surface 16 defines the reservoir 18, and the surface may be a top surface 57 of a transverse wall 58 that may extend substantially normal to the assembly axis 20. The top surface 57 of a transverse wall 58 may be concave, and the base aperture 25 may be formed through the transverse wall 58 at or along the assembly axis 20. The transverse wall 38 may have a peripheral edge 59 disposed between the first end 22 and the second end 24 (which may be open) of the base member 14.

A cylindrical top wall 60 may upwardly extend (extend in a direction from the second end 24 towards the first end 22 and along the Z-axis of the reference coordinate system of FIG. 4A) from the peripheral edge 59 of transverse wall 58 to the first end 22 of the base member 14. The peripheral edge 59 may be circular and have a first diameter, and a diameter of the cylindrical top wall 60 may diverge from the first diameter at the peripheral edge to a second diameter at the first end 22. A cylindrical bottom wall 62 may downwardly extend (extend in a direction from the first end 22 towards the second end 24 and along the Z-axis of the reference coordinate system of FIG. 4A) from the peripheral edge 59 of transverse wall 58 to the second end 24 of the base member 14. A diameter of the cylindrical bottom wall 62 may converge from the first diameter at the peripheral edge 59 to a third diameter at the second end 24, and the third diameter may be less than the first diameter and the second diameter.

Figure 6:
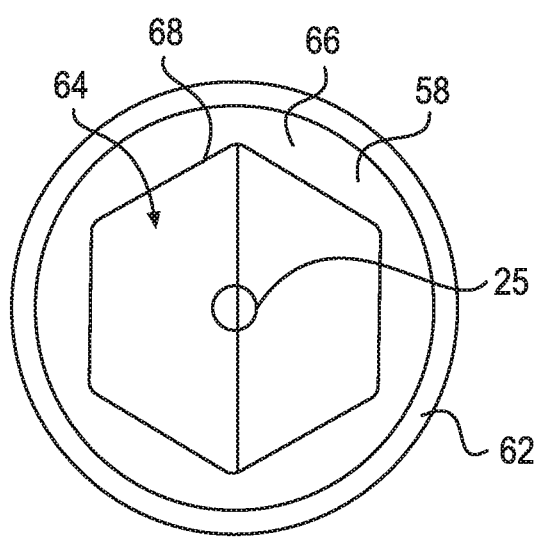
FIG. 6 is a section view taken along line 6-6 of FIG. 4A.
Figure 7:
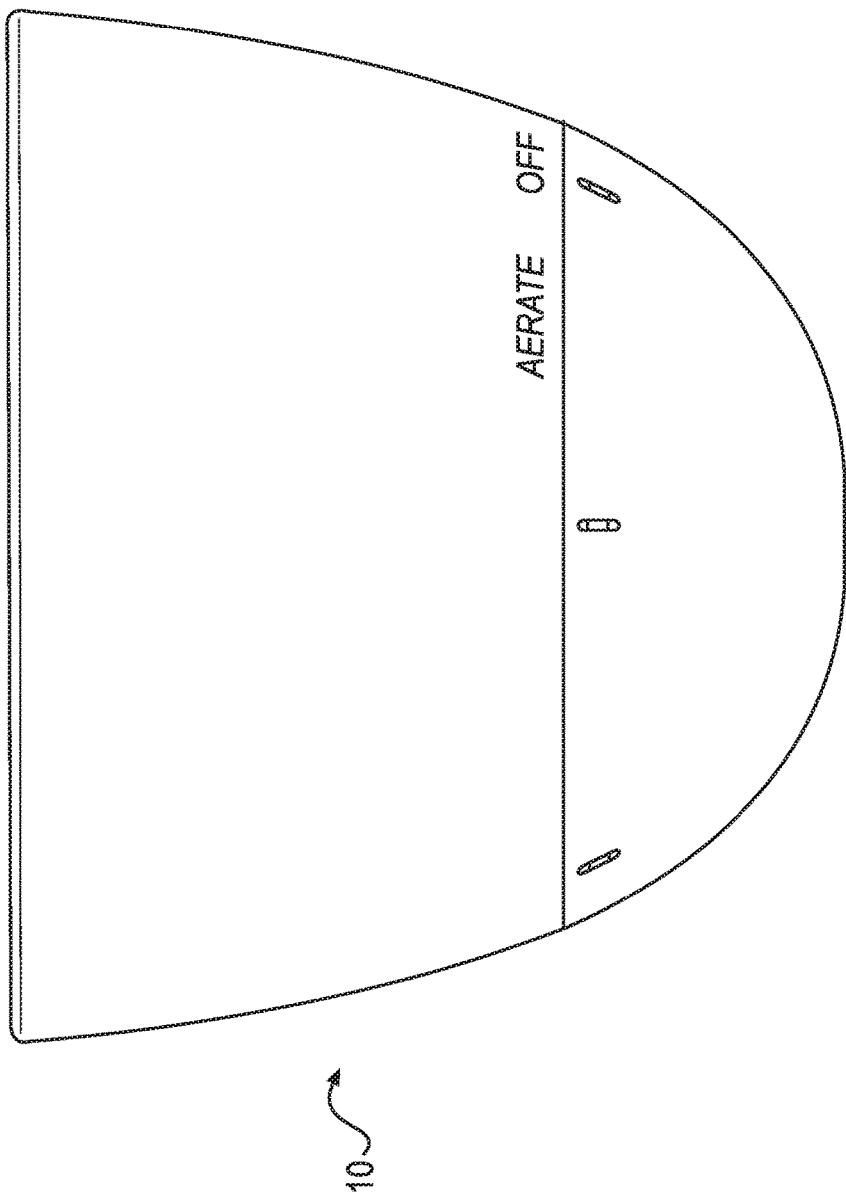
FIG. 7 is a side view of an embodiment of an assembly.
Figure 8:
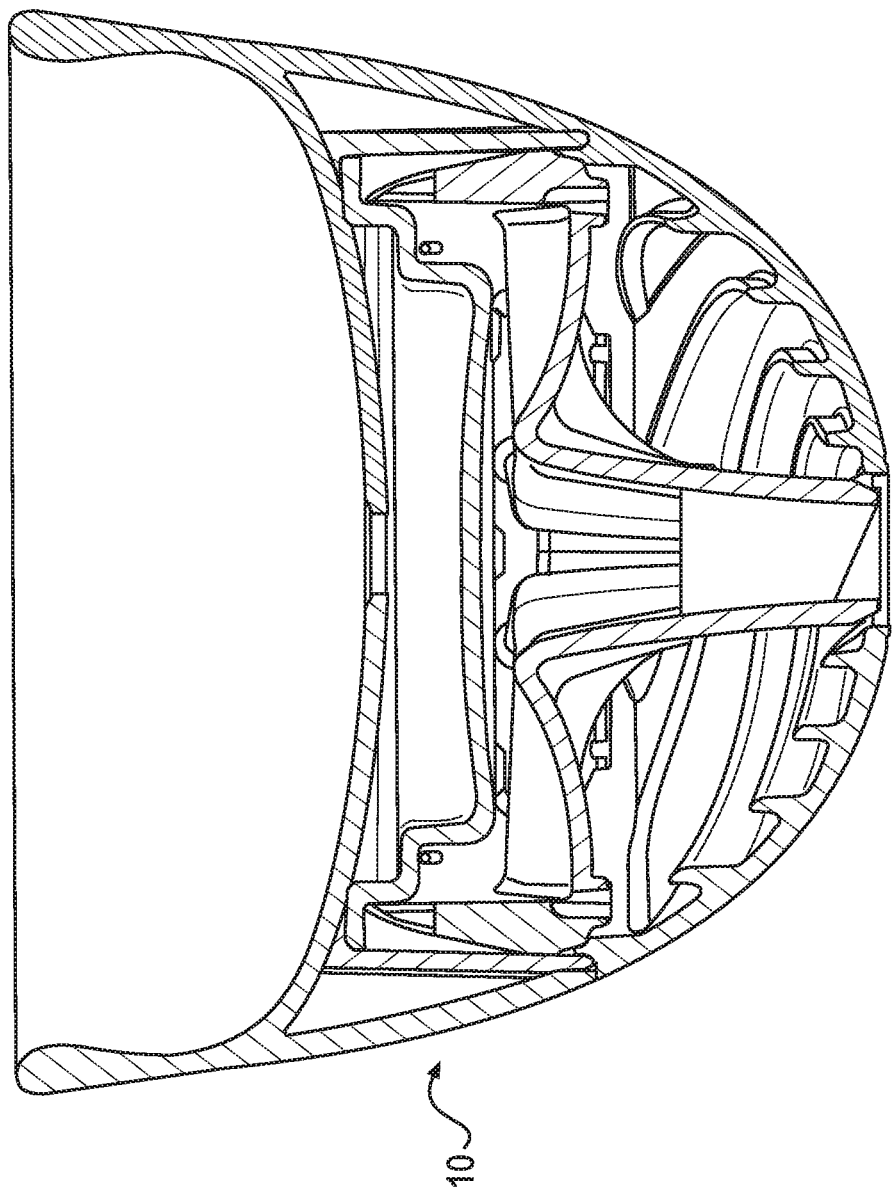
FIG. 8 is a sectional view of the embodiment of the assembly of FIG. 7.
Figure 9:
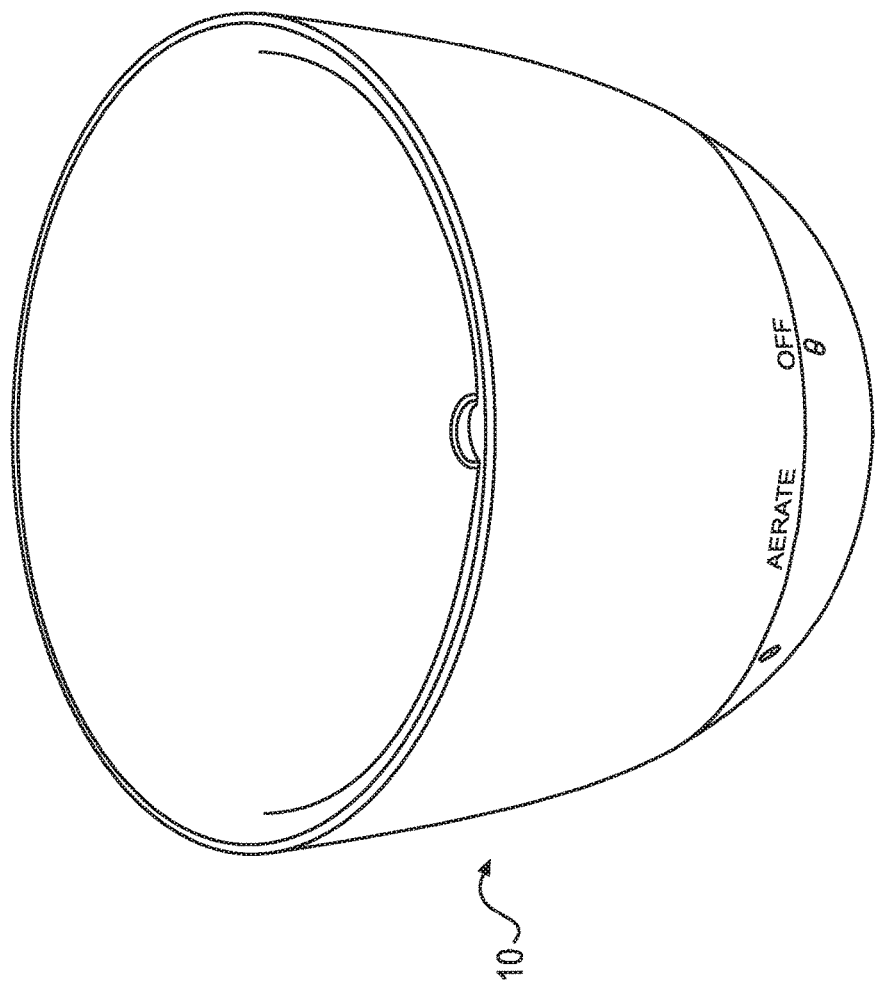
FIG. 9 is a perspective view of the embodiment of the assembly of FIG. 7.
Figure 10:
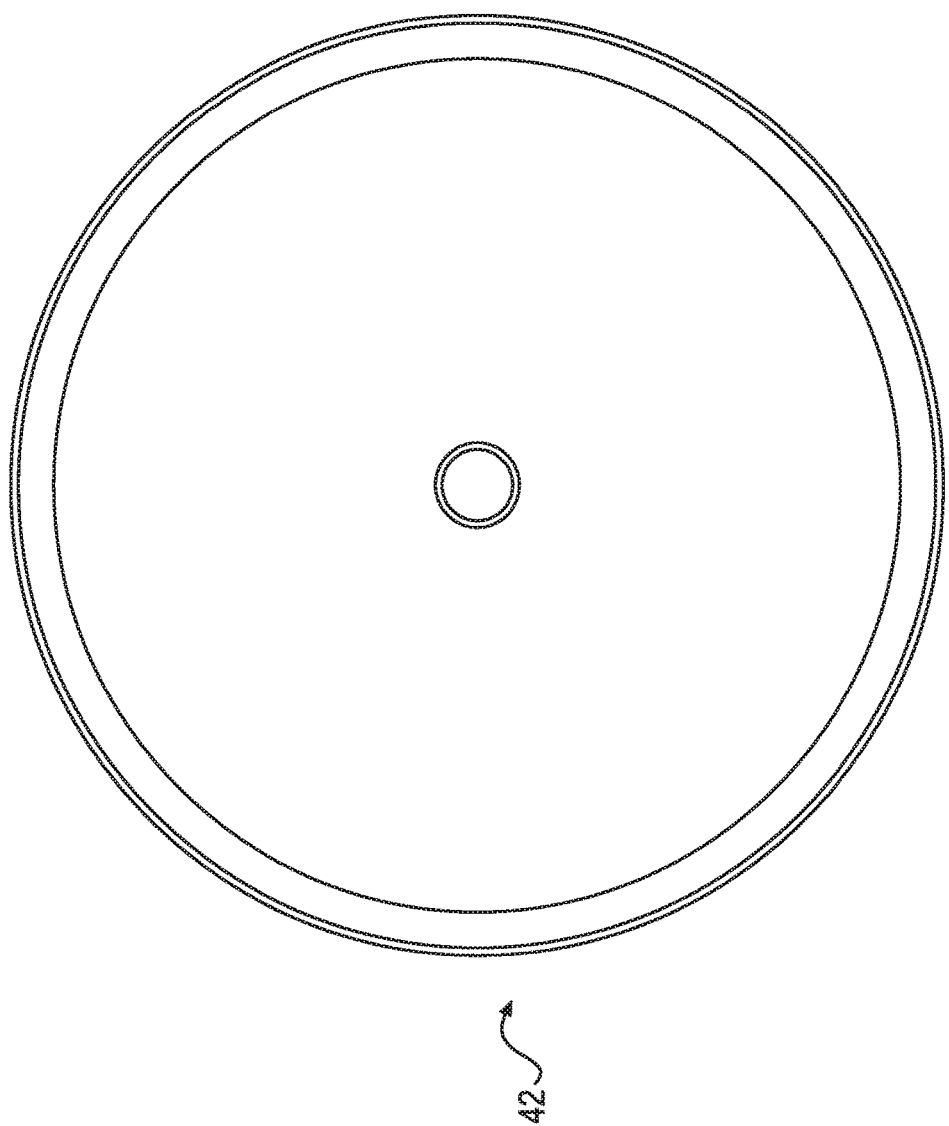
FIG. 10 is a bottom view of an embodiment of an aerator member of the assembly.
Figure 11:
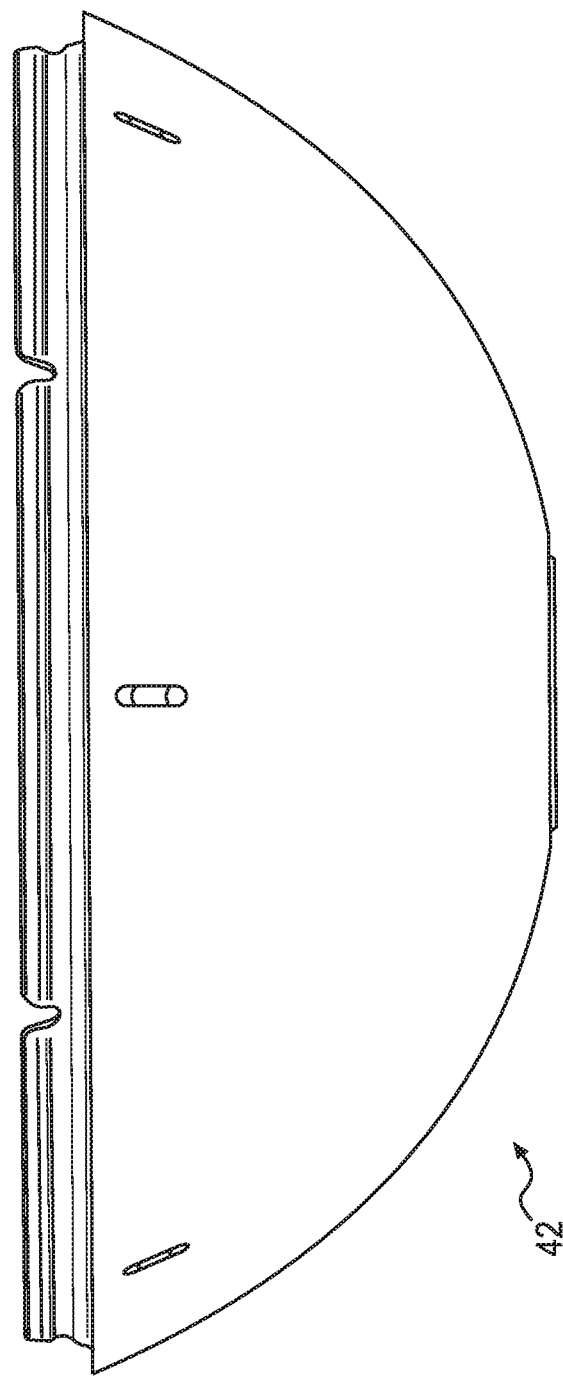
FIG. 11 is a side view of the embodiment of the aerator member of FIG. 10.
Figure 12:
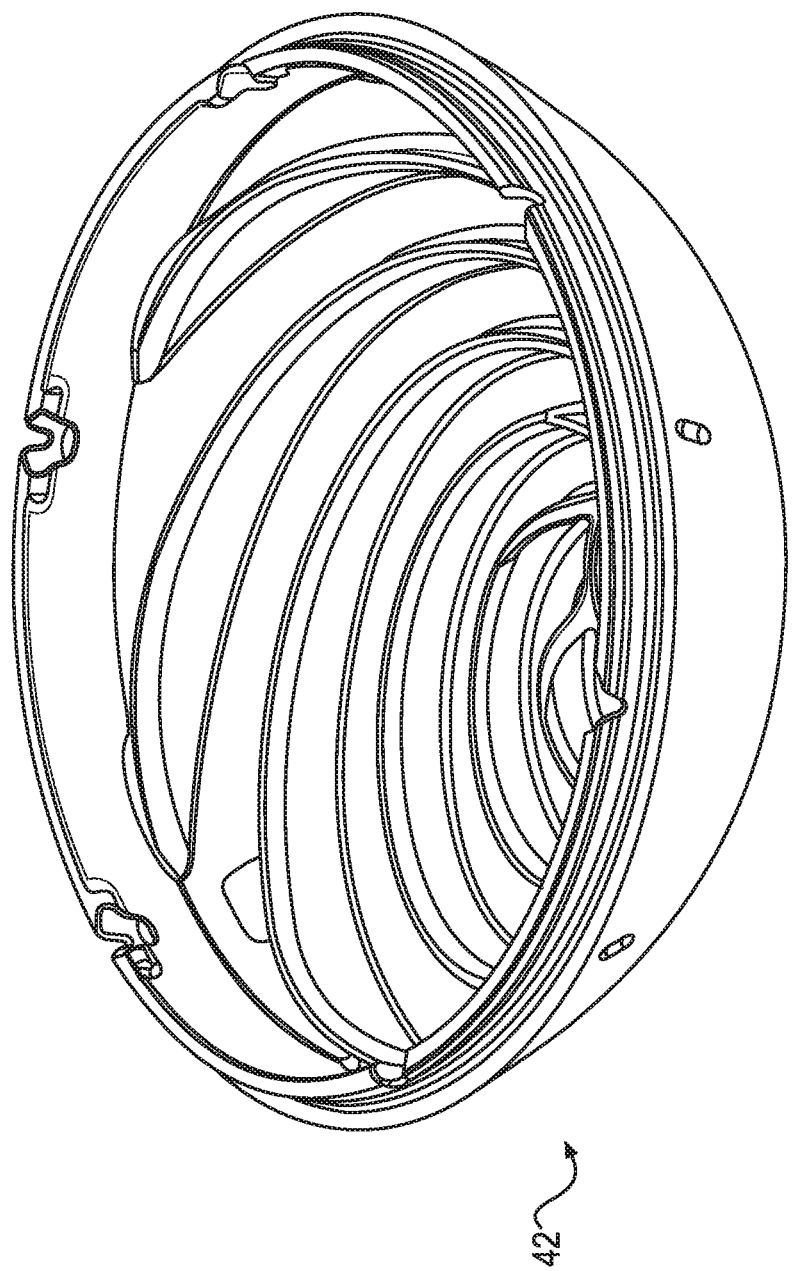
FIG. 12 is a perspective view of the embodiment of the aerator member of FIG. 10.
Figure 13:
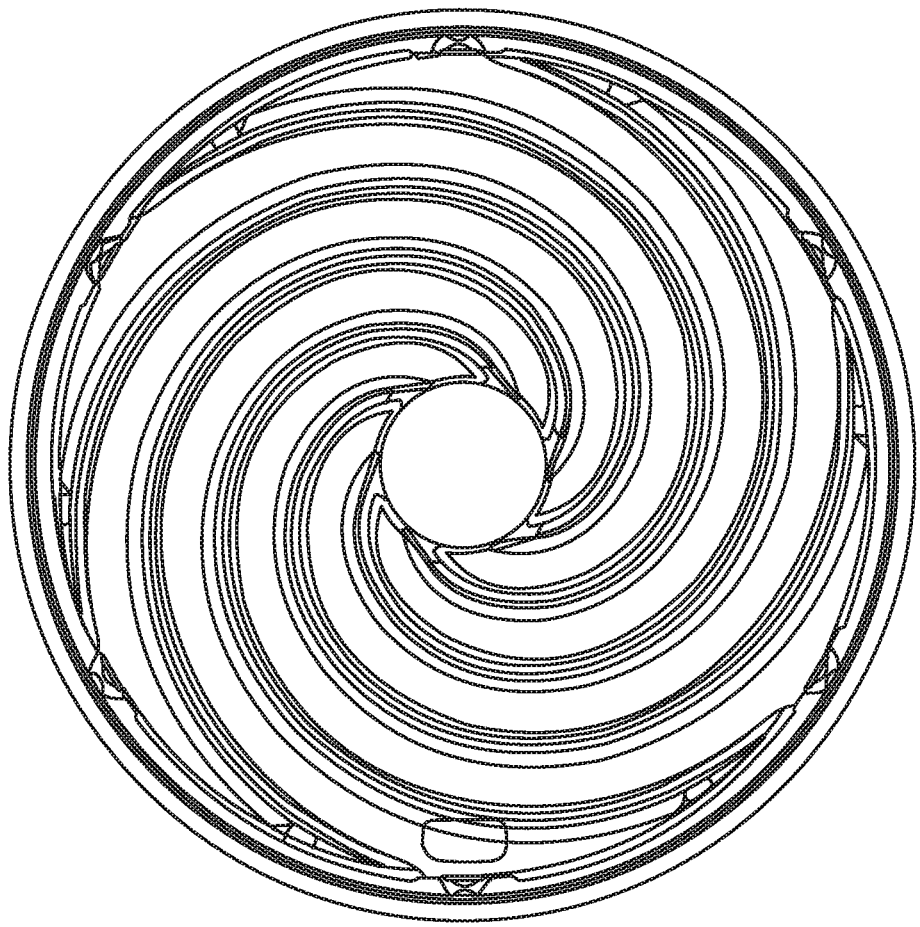
FIG. 13 is a top view of the embodiment of the aerator member of FIG. 10.
Figure 14:
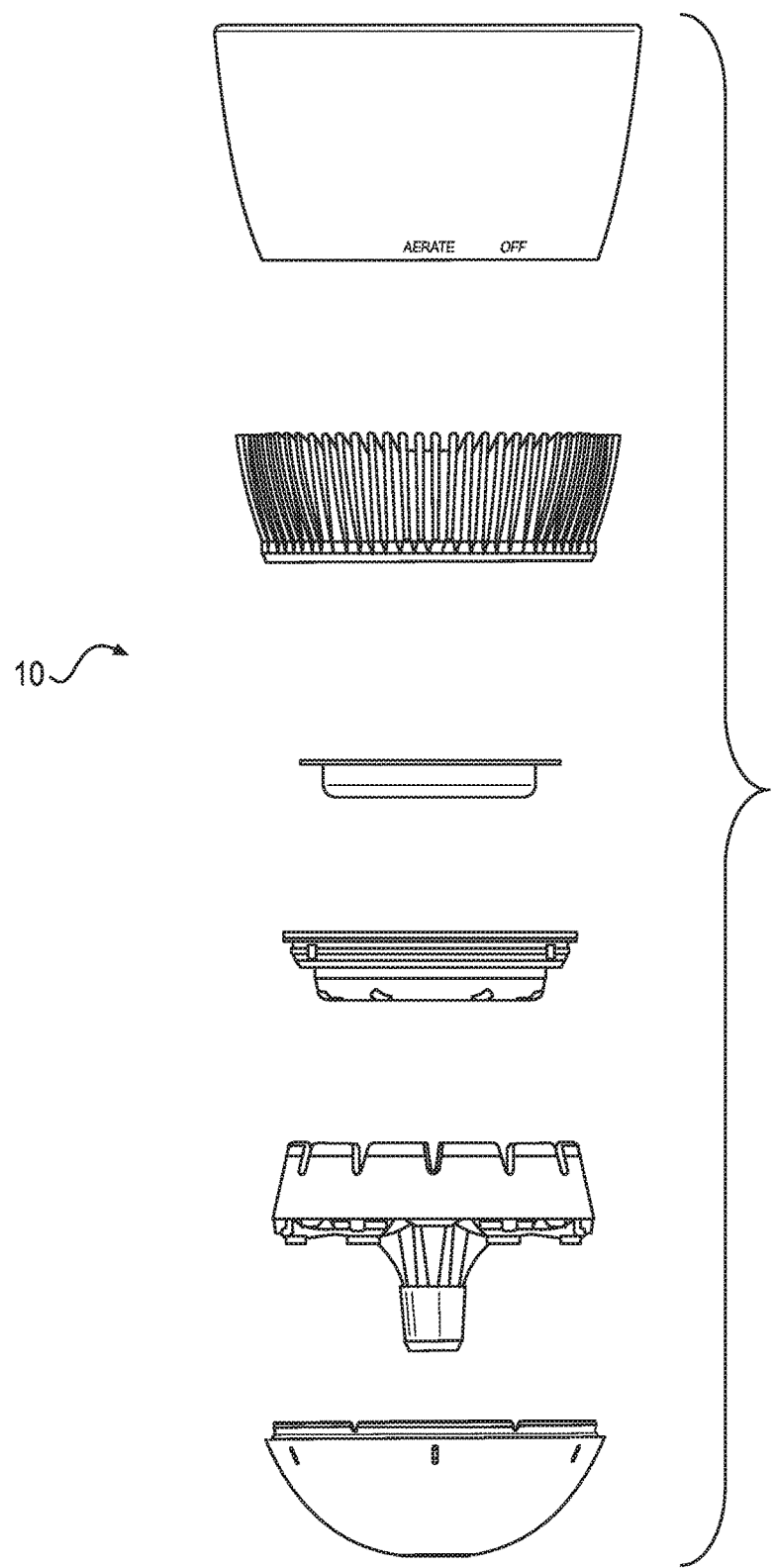
FIG. 14 is an exploded side view of an embodiment of an assembly.
Figure 15:
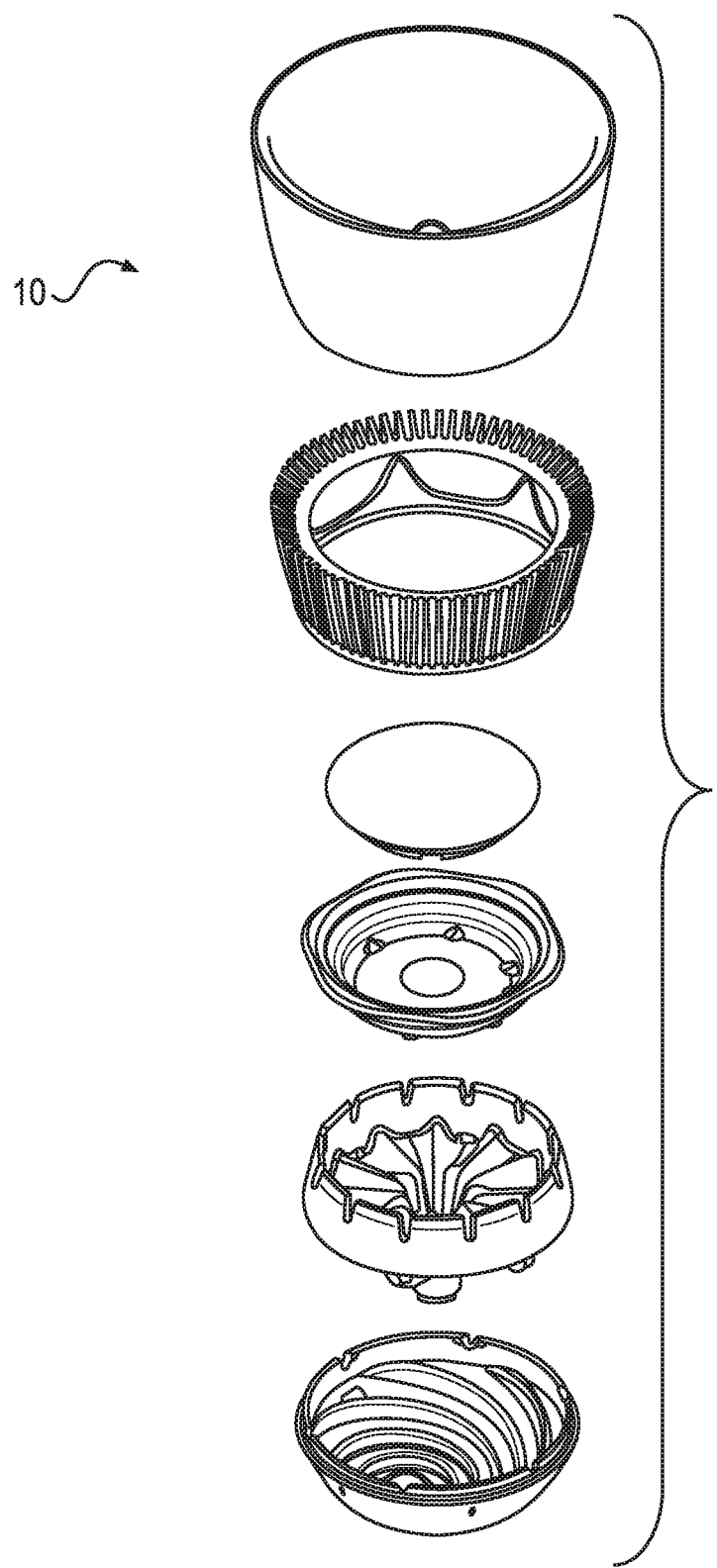
FIG. 15 is an exploded perspective view of an embodiment of an assembly.
Figure 16:
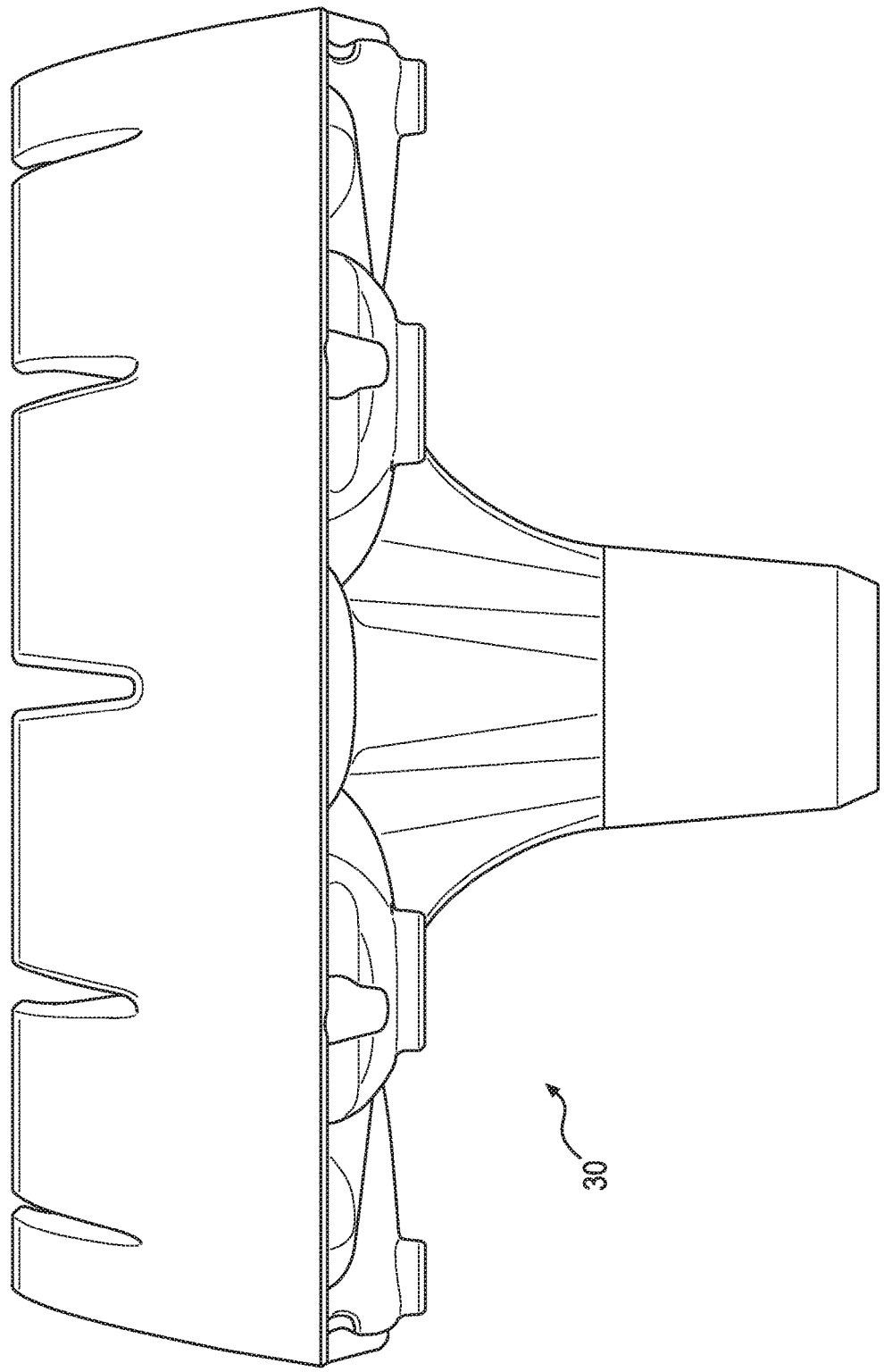
FIG. 16 is a side view of an embodiment of a diverter member of the assembly.
Figure 17:
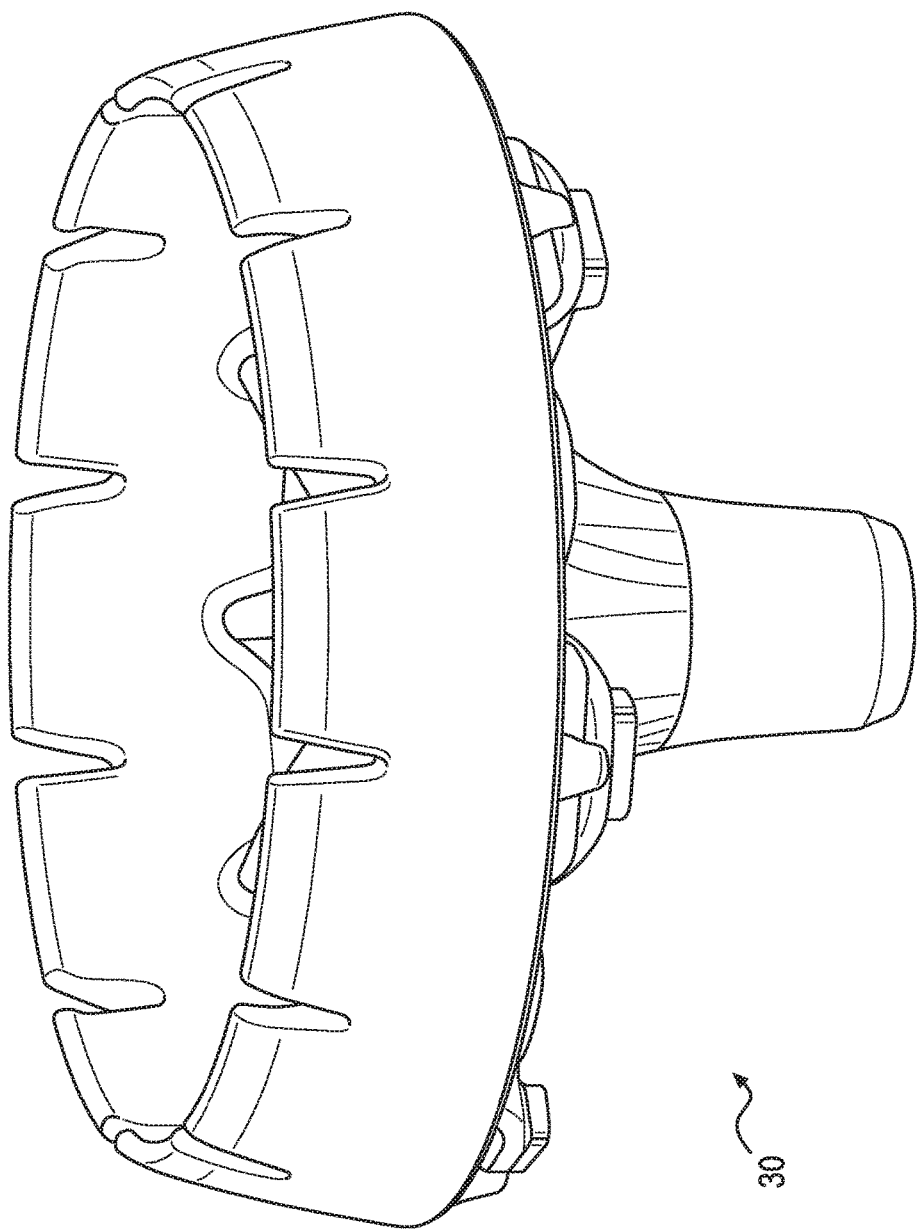
FIG. 17 is a perspective view of the embodiment of the diverter member of FIG. 10.
Figure 18:
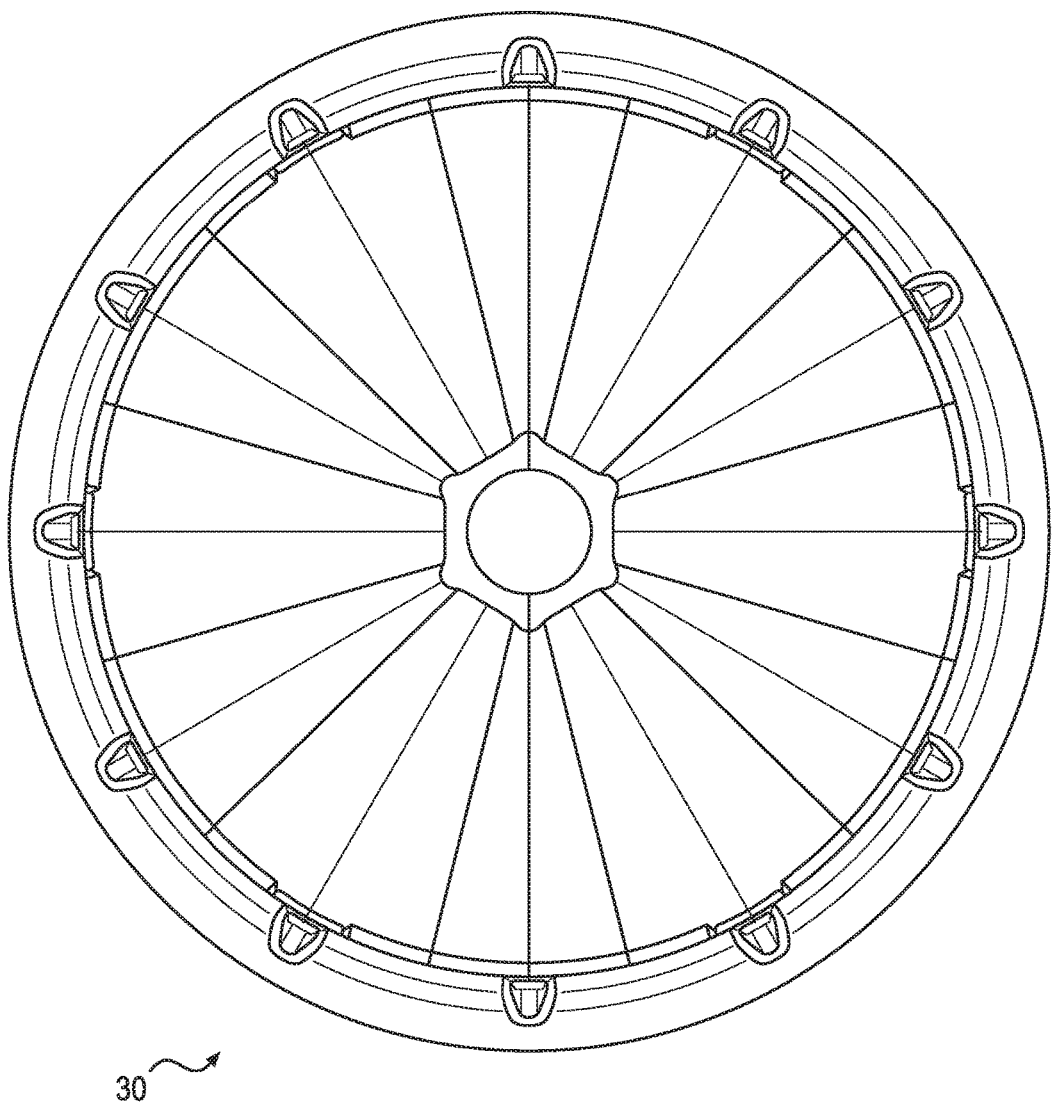
FIG. 18 is a bottom view of the embodiment of the diverter member of FIG. 10.
Figure 19:
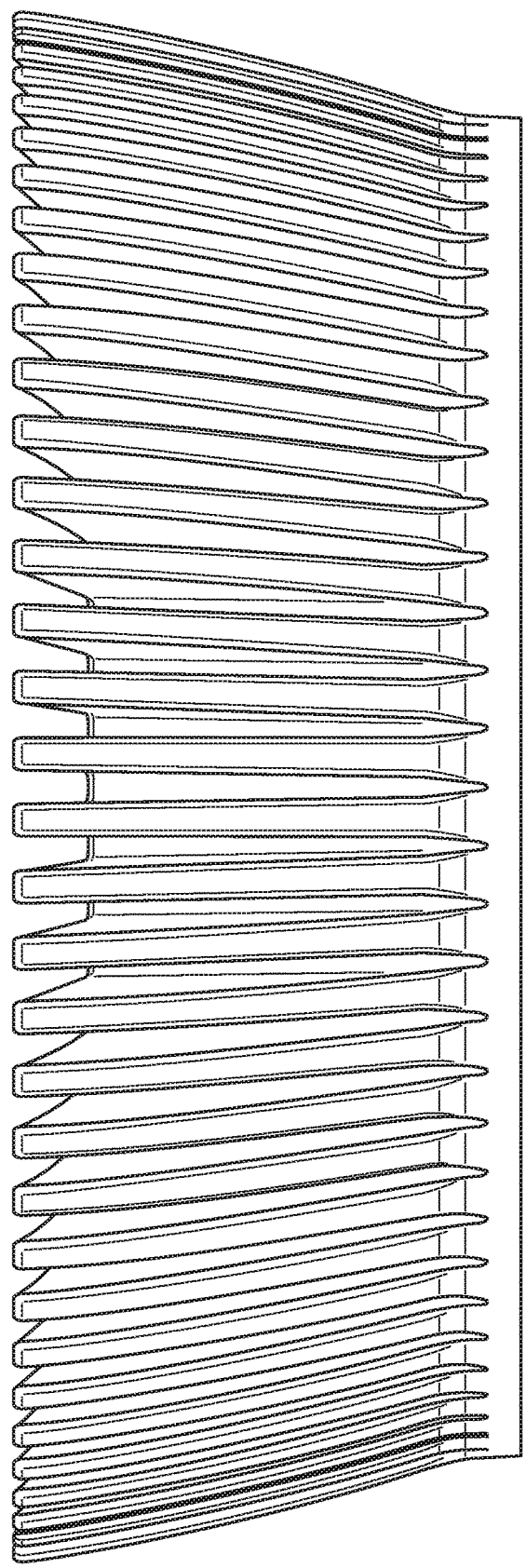
FIG. 19 is a side view of an embodiment of an internal support portion of the assembly.
Figure 20:
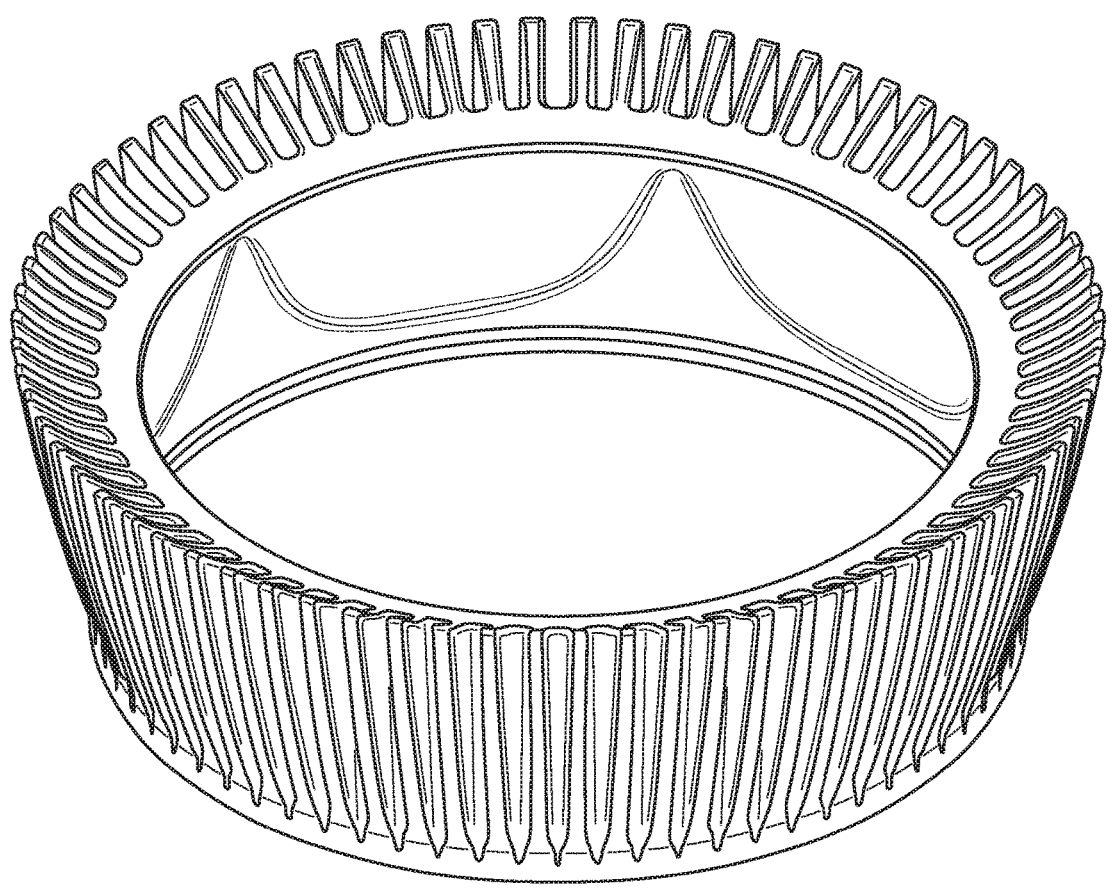
FIG. 20 is a perspective view of the embodiment of the internal support portion of FIG. 19.
Figure 21:
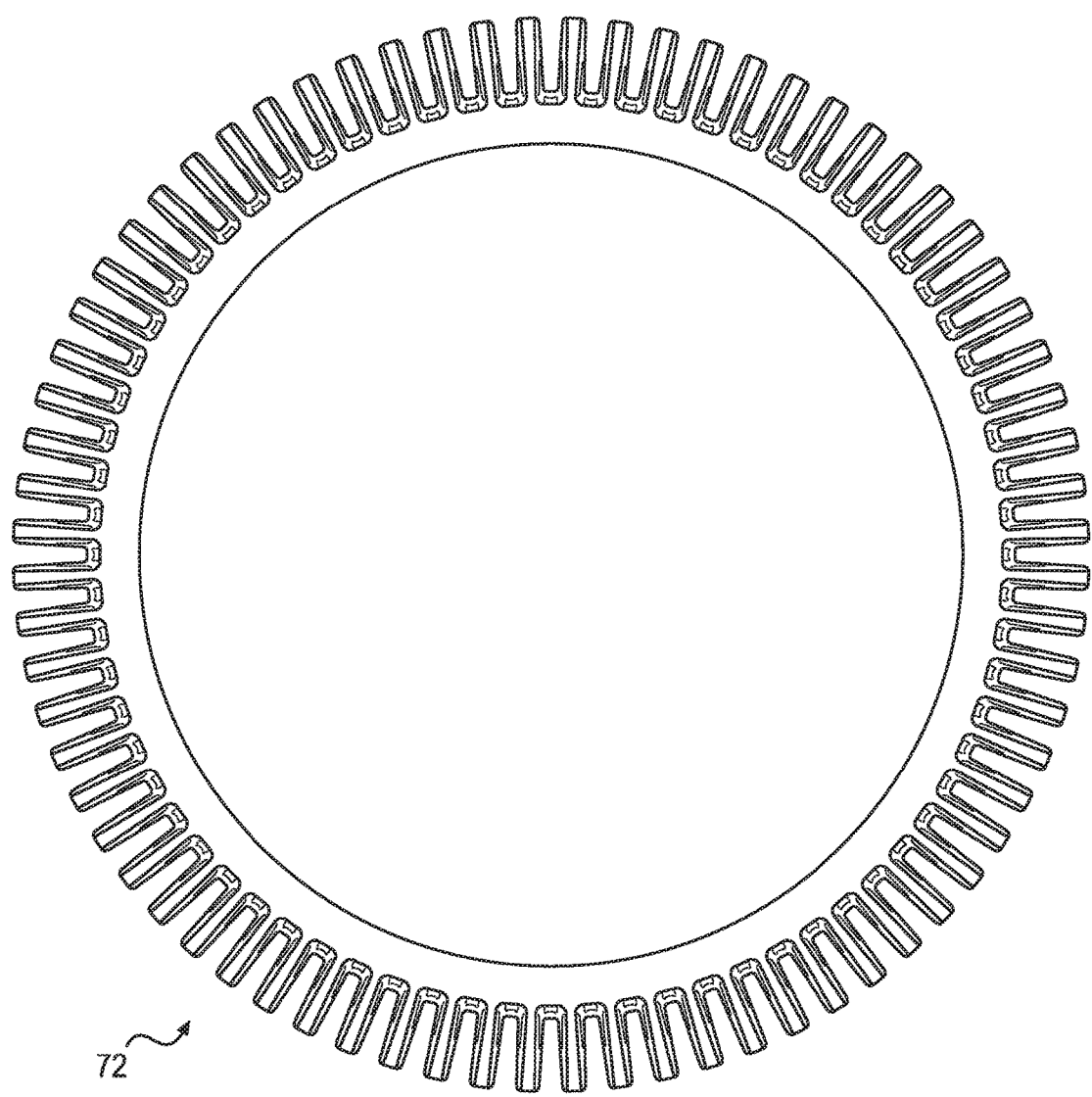
FIG. 21 is a top view of the embodiment of the internal support portion of FIG. 19.
Figure 22:
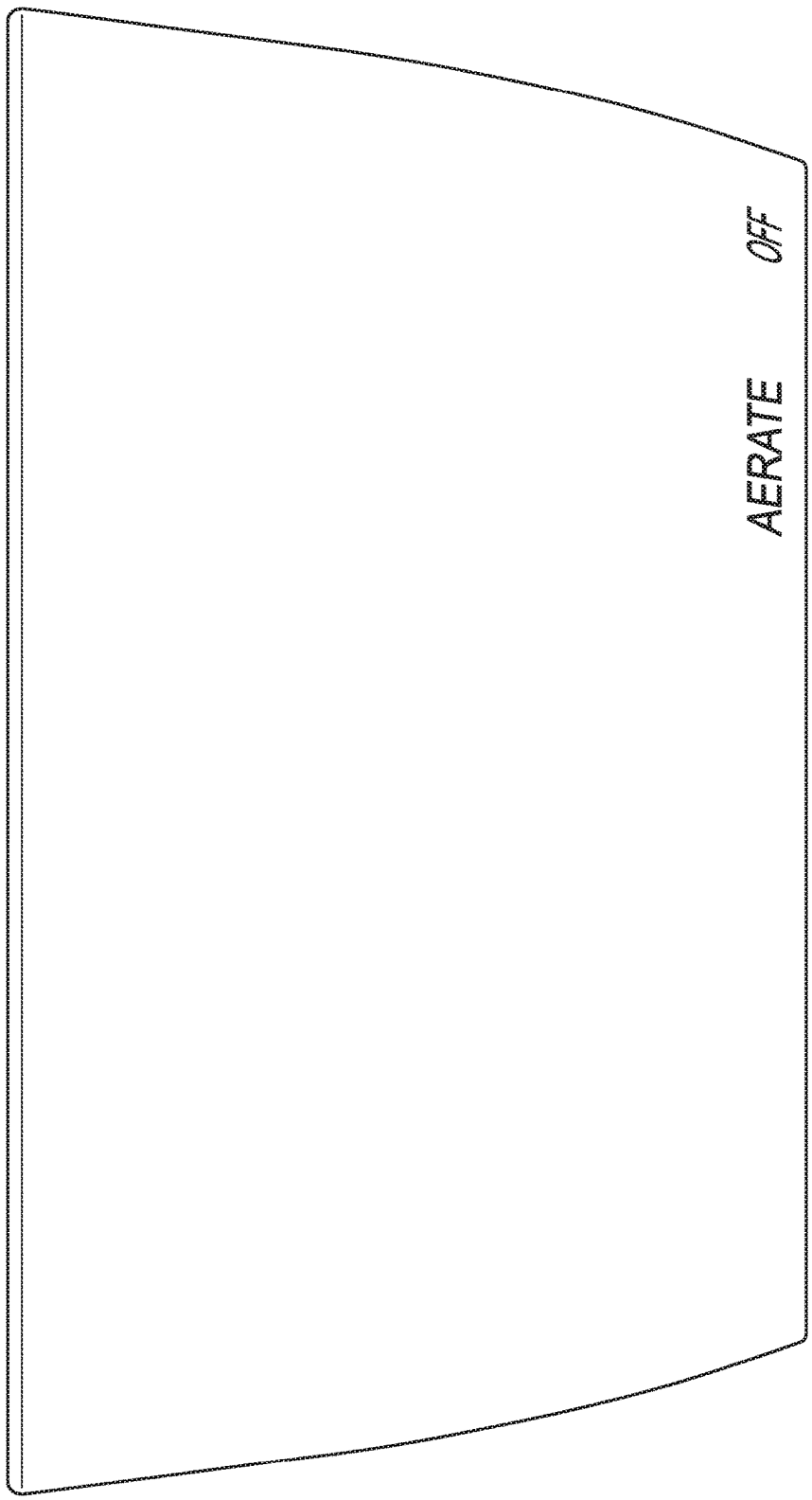
FIG. 22 is a side view of an embodiment of a base member of the assembly.
Figure 23:
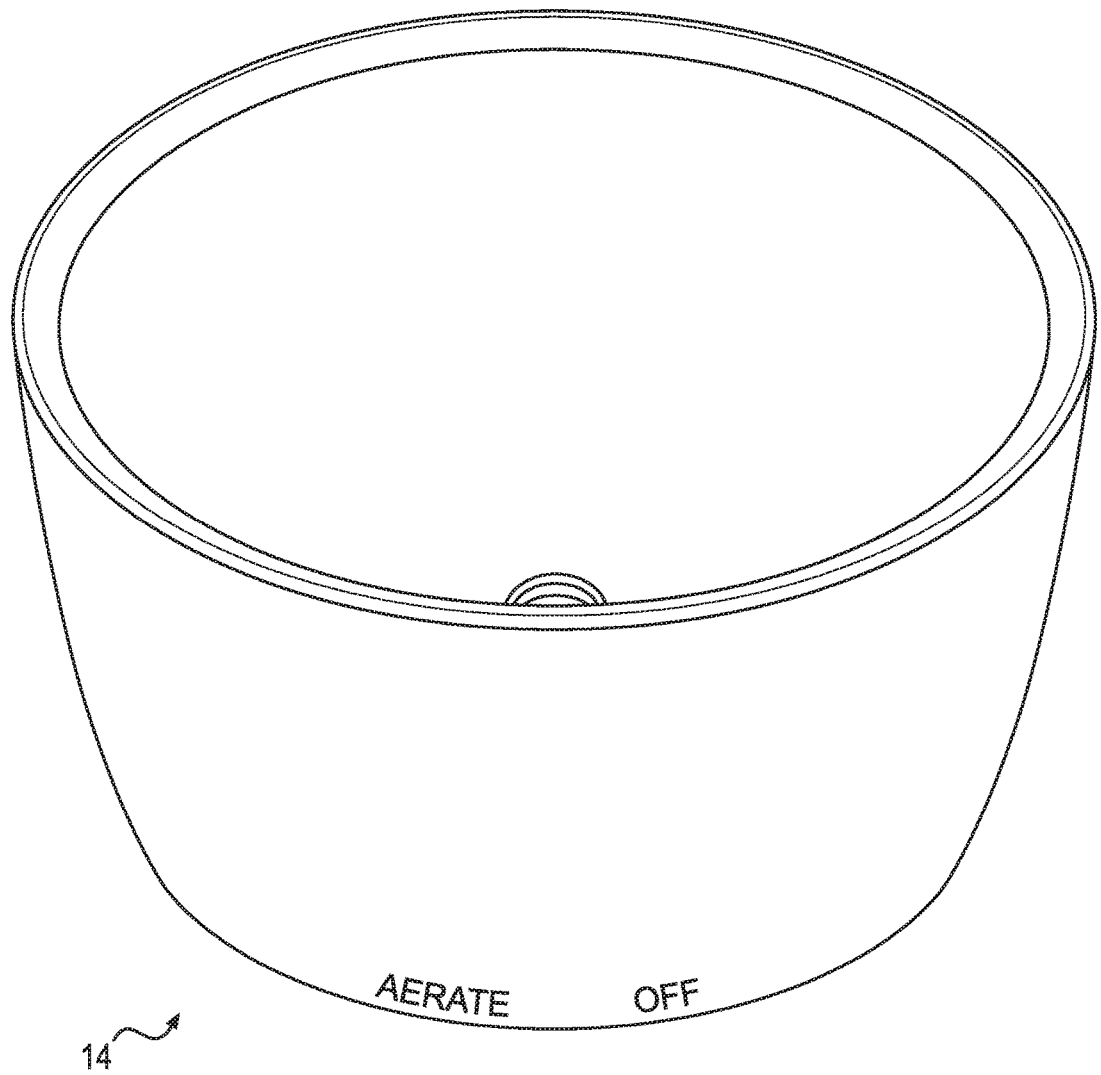
FIG. 23 is a perspective view of the embodiment of the base member of FIG. 22.
Figure 24:
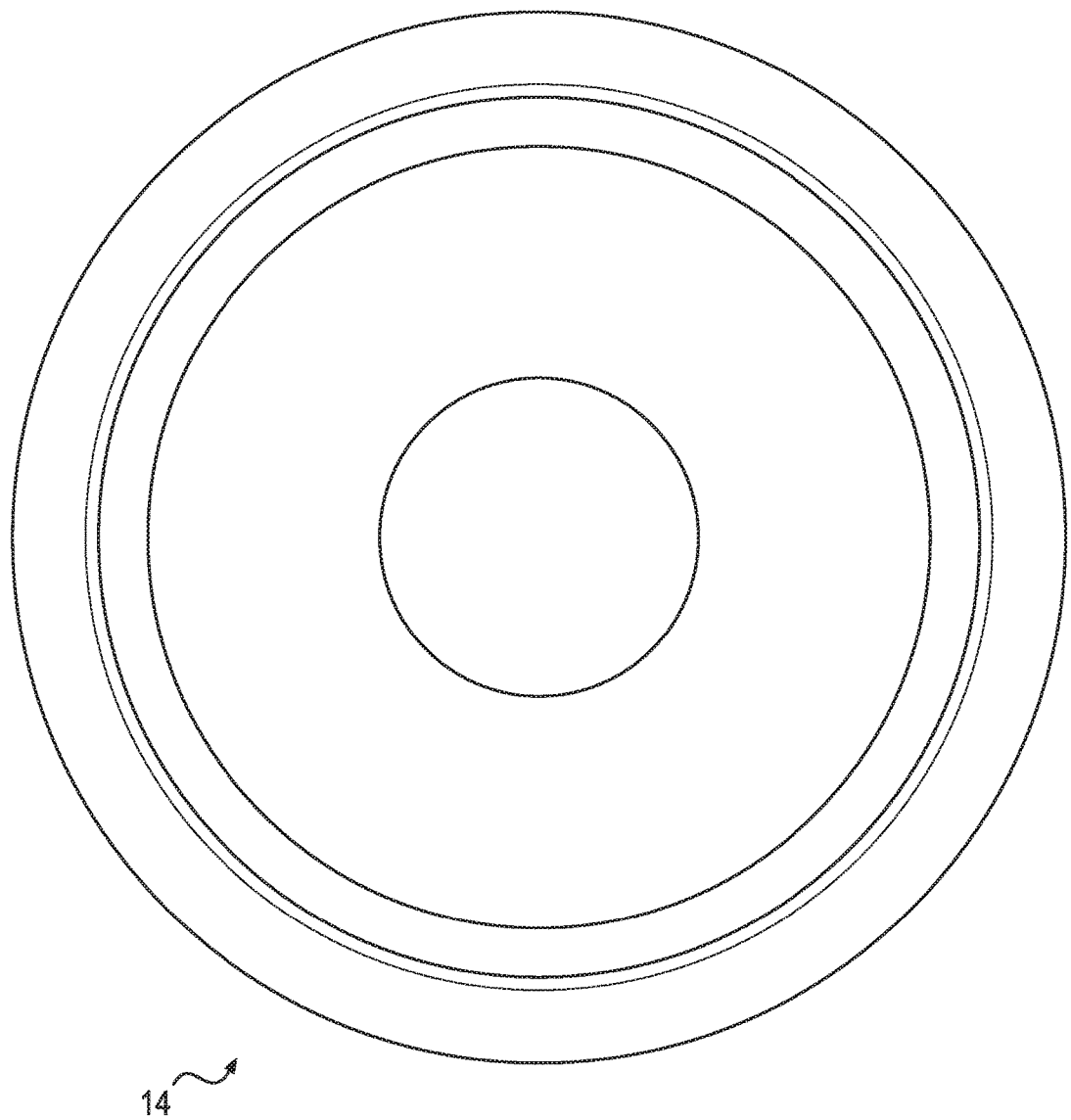
FIG. 24 is a bottom view of the embodiment of the base member of FIG. 22.
Figure 25:
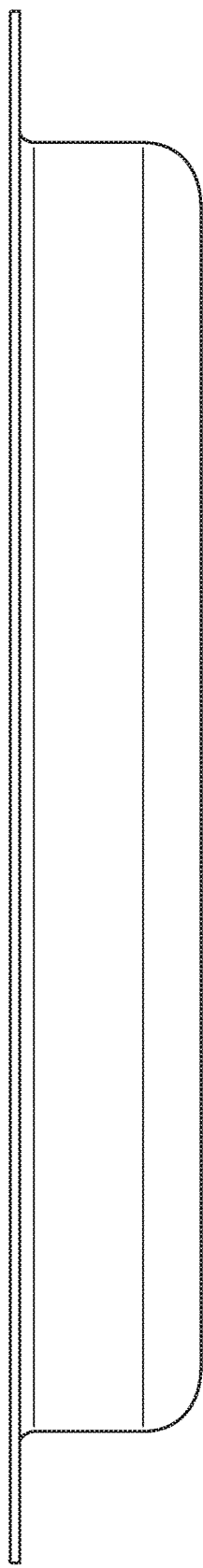
FIG. 25 is a side view of an embodiment of a filter pod of the assembly.
Figure 26:
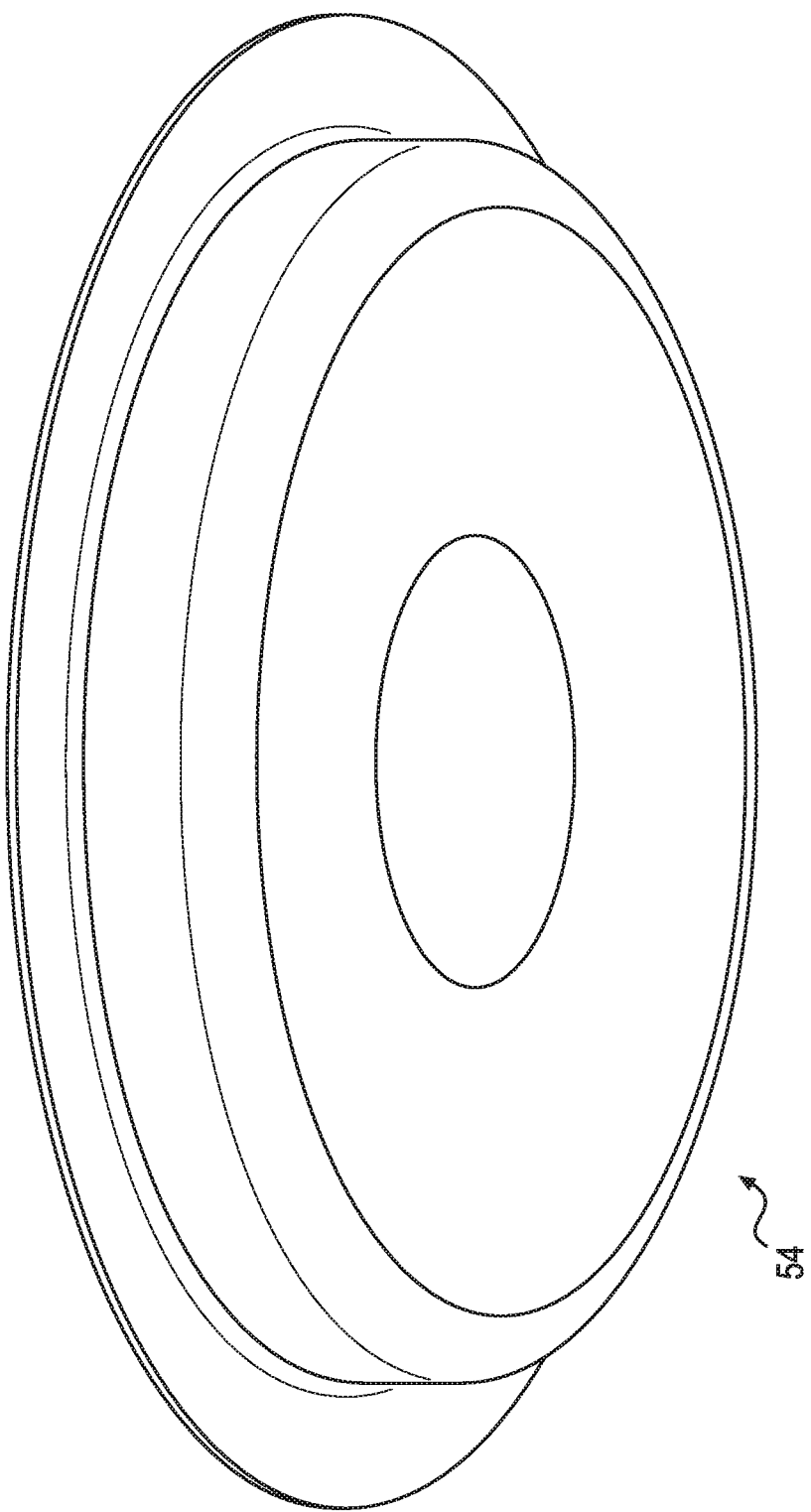
FIG. 26 is a perspective view of the embodiment of the filter pod of FIG. 25.
Figure 27:
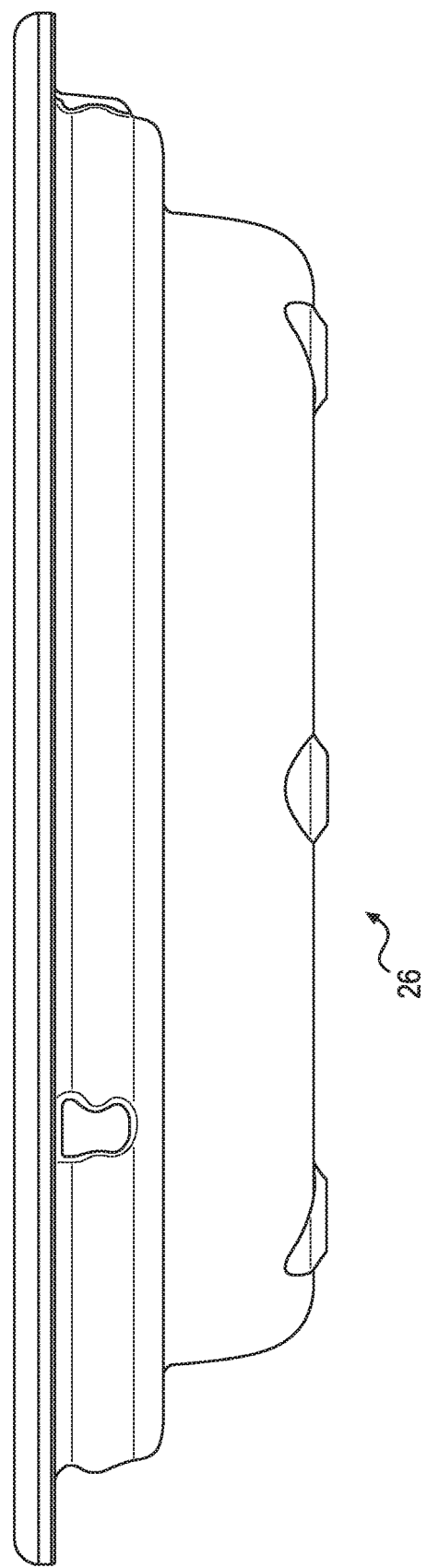
FIG. 27 is a side view of an embodiment of a support member of the assembly.
Figure 28:
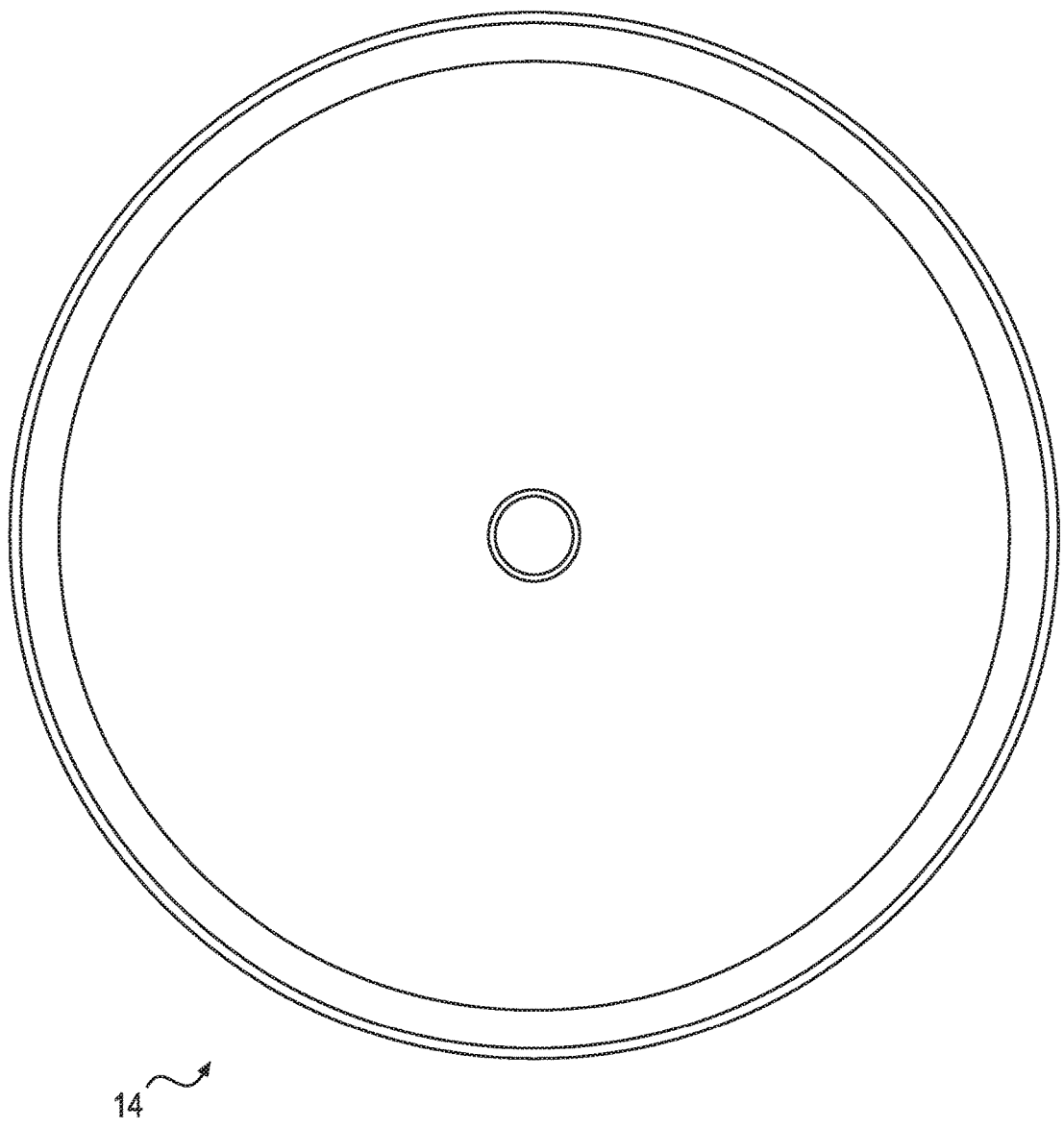
FIG. 28 is a top view of the embodiment of the base member of FIG. 22.

As illustrated in the cross-sectional view of FIG. 6 (taken normal to the assembly axis 20 and taken with the support member 26 removed for clarity), a receiving recess 64 may be formed in a bottom surface 66 of the transverse wall 58 of the base member 14, and the receiving recess 64 may be defined by a peripheral edge 68. The peripheral edge 68 may be non-circular and may correspond in shape to a non-circular peripheral edge 70 of a tab portion 71 of the support member 26 (see FIG. 2). Accordingly, all or a portion (i.e., a top portion) of the tab portion 71 of the support member 26 may be (removably) received into the receiving recess 64 such that that the non-circular peripheral edge 70 of the tab portion 71 of the support member 26 is slightly inwardly offset from the peripheral edge of the receiving cavity 64 such that the support member 26 cannot rotate about the assembly axis 20 when the tab portion 71 is disposed in the receiving recess 64. In some embodiments, the peripheral edge 70 of the support member 26 and the peripheral edge 68 of the receiving recess 64 may both be hexagonal, pentagonal, octagonal, or any non-circular shape or combination of shapes that prevents the support member 26 from rotating about the assembly axis 20 relative to the base member 14.

The base member 14 may be made from various materials including but not limited to a silicone rubber or from a plastic, such as a semi-rigid or rigid plastic. An optional cylindrical internal support portion 72 (see FIG. 1) may be disposed within a cavity formed by the bottom wall 62 to provide structural support to the base member 14.

Figure 2B:
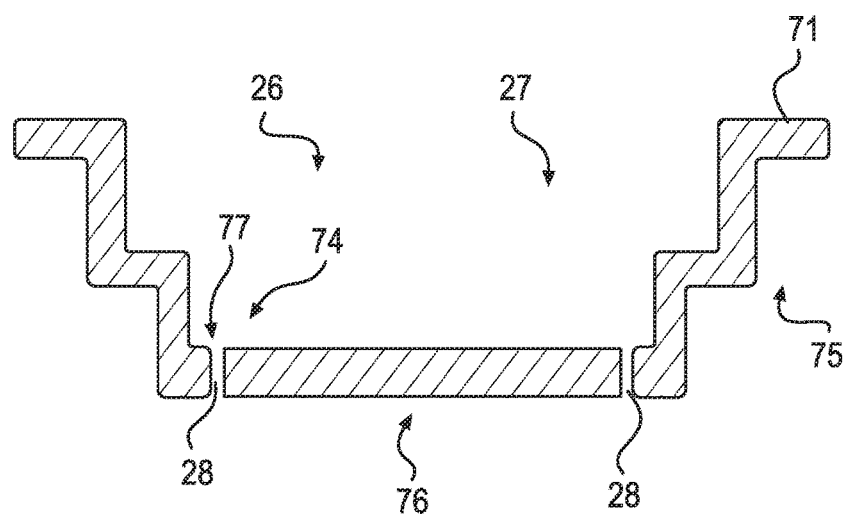
Figure 2C:
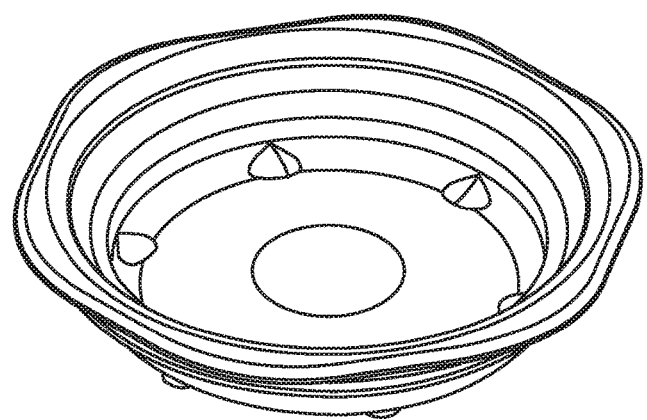

Referring to FIGS. 1, 2A, and 2B, the assembly 10 also includes the support member 26 non-rotatably coupled to the base member 14. The support member 26 may have a tray portion 74 disposed inward of the tab portion 71, and the tray portion 74 may have an outer wall 75 extending downward from the tab portion 71. A lower wall 76 may inwardly extend from a lower peripheral portion of the outer wall 75, and an inner surface of the outer wall 75 and an upper surface of the lower wall 76 may at least partially define the recess 27. The at least one support aperture 28 may be formed in the recess 27 (e.g., formed through the lower wall 76 adjacent to a peripheral edge 77 of the lower wall 76). In some embodiments, the support member 26 may include a plurality (such as 3, 4, 5 6, 7, 8, 9, 10 or more) of support apertures 28, and the plurality of support apertures 28 may be uniformly arrayed about a center axis (e.g., aligned with the assembly axis 20) of the support member 26. The lower wall 76 of the tray portion 74 may be convex such that liquid contacting the tray portion 74 may flow towards the peripheral edge 77 of the lower wall 76. The top surface 56 of the lower wall 76 may support the filter pod 54, which may be disk-shaped and may have a diameter slightly smaller than the diameter of the outer wall 75. The outer wall 75 may have any shape or combination of shapes, such as a stepped profile when viewed in cross-section.

Figure 4B:
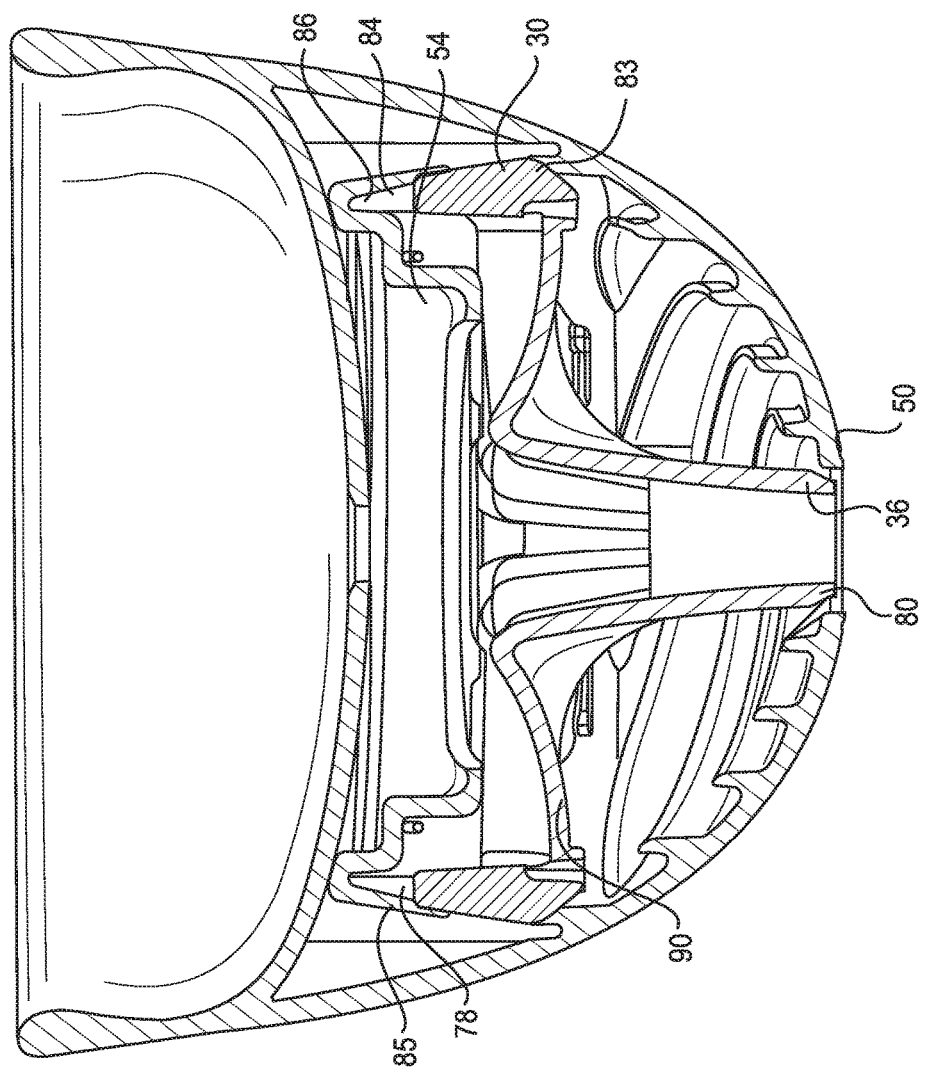
FIG. 4B is a side sectional view of an embodiment of a diverter member of the assembly in a second diverter position.

The assembly 10 further includes the diverter member 30 rotatably coupled to the support member 26 and rotatable between a first diverter position (illustrated in FIGS. 3A and 4B) and a second diverter position (illustrated in FIGS. 3B and 4A). The diverter member 30 extends along the assembly axis 20 from an open first end 78 to a second end 80 that is opposite the first end 78. The diverter member 30 has a cylindrical upper wall 82 that extends from the first end 78 to an intermediate point 83 between the first end 78 and the second end 80. A top portion of the upper wall 82 has a plurality of first engagement features 84 disposed around the circumference of the top portion 85. When the circumference of the top portion 85 (at the first end 78 of the diverter member 30) is disposed around an outer portion of the outer wall 75 of the support member 26, each of the first engagement features 84 may engage with a corresponding second engagement feature 86 of the support member 26 to secure the diverter member 30 to the support member 26. The skilled person would recognize that the first engagement features 84 and the second engagement features 86 may be any features that cooperate to removably lock or position the diverter member 30 in a desired position relative to the support member 26. For example, the first engagement features 84 may be tabs with detents and the second engagement features 86 may be recesses or aperture that receive the detents on the tabs. Alternatively, the second engagement features 86 may be tabs with detents and the first engagement features 84 may be recesses or aperture that receives the detents on the tabs, or any combination thereof.

With the diverter member 30 secured to the support member 26 such that the first engagement features 84 is engaged with the corresponding second engagement feature 86 (a first one of the second engagement features 86), the diverter member 30 is disposed in the first diverter position (illustrated in FIG. 3A). When the diverter member 30 is rotated relative to the support member 26 (in a first rotational direction), the first engagement features 84 may disengage with the corresponding second engagement feature 86 (the first one of the second engagement features 86) and may rotate into engagement with an adjacent second engagement feature 86 (a second one of the second engagement features 86) such that the diverter member 30 is disposed in the second diverter position (illustrated in FIG. 3B).

A further rotation of the diverter member 30 relative to the support member 26 (in the first rotational direction) will cause the first engagement features 84 to disengage with the corresponding second engagement feature 86 (the second one of the second engagement features 86) and to rotate into engagement with an adjacent second engagement feature 86 (a third one of the second engagement features 86) such that the diverter member 30 is disposed in the first diverter position. One more rotation of the diverter member 30 relative to the support member 26 (in the first rotational direction) will cause the first engagement features 84 to disengage with the corresponding second engagement features 86 (the third one of the second engagement features 86) and to rotate into engagement with an adjacent second engagement feature 86 (a fourth one of the second engagement features 86) such that the diverter member 30 is disposed in the first diverter position. The rotations may repeat indefinitely. The skilled person would recognize that any or all of the rotations may be in a second rotational direction opposite to the first rotational direction.

Figure 5:
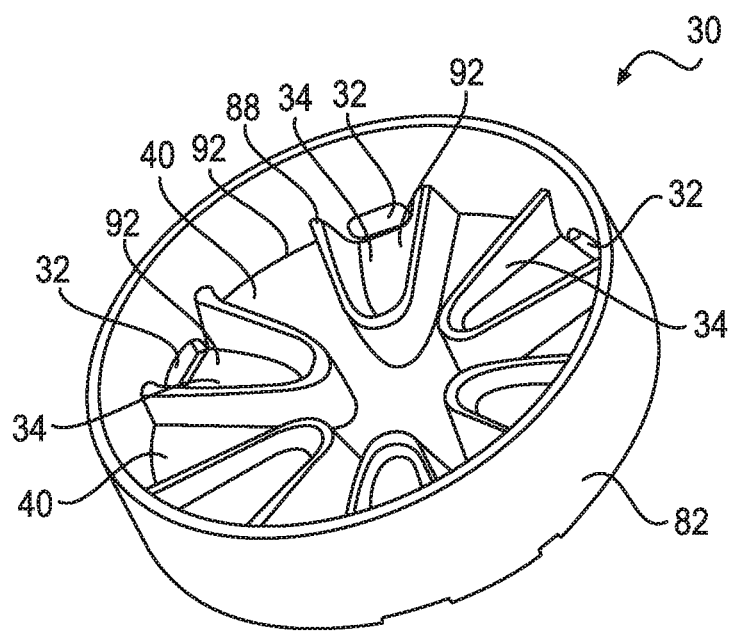
FIG. 5 is an embodiment of a diverter member of the assembly.

The diverter member 30 has at least one primary aperture 32 disposed within the trough portion 34. As illustrated in FIG. 5, each trough portion 34 includes a side wall 88 that surrounds the primary aperture 32 such that liquid flowing through the support aperture 32 when the diverter member 30 is in the first diverter position is retained within the side walls 88. Opposing walls of the side walls 88 may converge as the walls extend towards the assembly axis 20. A bottom surface 90 of the trough portion 34 may be angled towards the primary aperture 32 so that any liquid in the trough portion 32 flows though the primary aperture 32. Any number of primary apertures 32 and trough portions 34 may be included in the diverter member 30, and the number of primary apertures 32 may be equal to the number of support apertures 28 (for example, six primary apertures 32 and six trough portions 34).

The diverter member 30 has at least one secondary aperture 36 disposed at the first end 38 of the channel portion 40. The channel portion 40 may extend from the second end 52, disposed adjacent to a bottom portion 92 of the upper wall 82 to the first end 38 disposed adjacent to or at the secondary aperture 36. The secondary aperture 36 may be defined by a downwardly extending spout that decreases in diameter as the spout approaches the second end 80 of the diverter member 30. Each channel portion 40 may be disposed between adjacent trough portions 34 such that portions of the side walls 88 of the adjacent trough portions 34 maintain liquid in the channel to flow from the second end 52 of the channel portion 40 to the first end 38 and through the secondary aperture 36. Any number of channels may be included in or on the diverter member 30 and the number of channel portions 40 may be equal to the number of support apertures 28 (for example, six channel portions 40).

The assembly 10 additionally includes the aerator member 42 non-rotatably secured to the diverter member 30. The aerator member 42 extends along the assembly axis 20 from an open first end 94 to a second end 96 that is opposite the first end 94, and the aeration aperture 50 may be disposed at the second end 96. The second end 96 may disposed at or adjacent to the second end 80 of the diverter member (and the end of the spout defining the end of the secondary aperture 36). In some embodiments, the end of the spout defining the end of the secondary aperture 36 of the diverter member 30 may extend through the aeration aperture 50. The aerator member 42 may have a generally parabolic cross-sectional shape, and the first end 94 of the aerator member 42 may be secured to a portion (i.e., a lower external portion) of the upper wall 82 of the diverter member 30. The first end 94 of the aerator member 42 may be removably secured to the portion of the upper wall 82 in any suitable manner, such as by snap features, for example. The first end 94 of the aerator member 42 may be non-rotatably secured to the portion of the upper wall 82 such that rotation of the aerator member 42 about the assembly axis 20 results in a corresponding rotation of the diverter member 30 (relative to the support member 26 and the base member 14).

The aerator member 42 may also have a plurality of raised elongated flow features 44 disposed on or along an inner surface 98 of the aerator member 42. Each flow feature 44 extends from the first end 46 to the second end 48 such that the flow feature extends in a portion of a spiral shape on or along an inner surface 98 of the aerator member 42.

That is, each flow feature 44 extends from the first end 46 to the second end 48, and the first end 46 of each flow feature 44 is separated by a vertical distance (along the assembly axis 20, and the first end 46 is higher than the second end 48 when the assembly axis 20 is disposed vertically) and a circumferential distance on or along the inner surface 98 of the aerator member 42. So configured, liquid flowing from the primary aperture 32 (when the diverter portion 30 is in the first diverter position) contacts a portion of the flow feature 44 (e.g., a portion at or adjacent to the first end 46) and flows along the elongated flow feature 44 to (or adjacent to) the second end 48 and then flows out of the aeration aperture 50 (or a gap between the aeration aperture 50 and an outer surface of the spout defining the secondary aperture 36) or into engagement with another portion of an adjacent flow feature 44. A plurality of flow features 44 may be disposed on the aeration member 30, and the flow features 44 may have varying lengths and/or positions. At least one flow feature 44 may have a first end 46 that is vertically aligned with a primary aperture 32 when the diverter member 30 is in the first diverter position. Each flow feature 44 maximizes the flow path length of a liquid (e.g., a red wine) though the aeration member 30, thereby aerating the liquid prior to the liquid exiting the aeration aperture 50. As previously, mentioned, if it is desired to filter a liquid without aerating the liquid (e.g., white wine), the diverter member 30 is rotated into the second diverter position such that flow along the flow features 44 of the aerator member 42 is avoided, as previously described. Indicia may be printed on an exterior of the base member and/or the aeration member 42 so a user can visually determine if the diverter member 30 is in the first or second diverter position.

Figure 29:
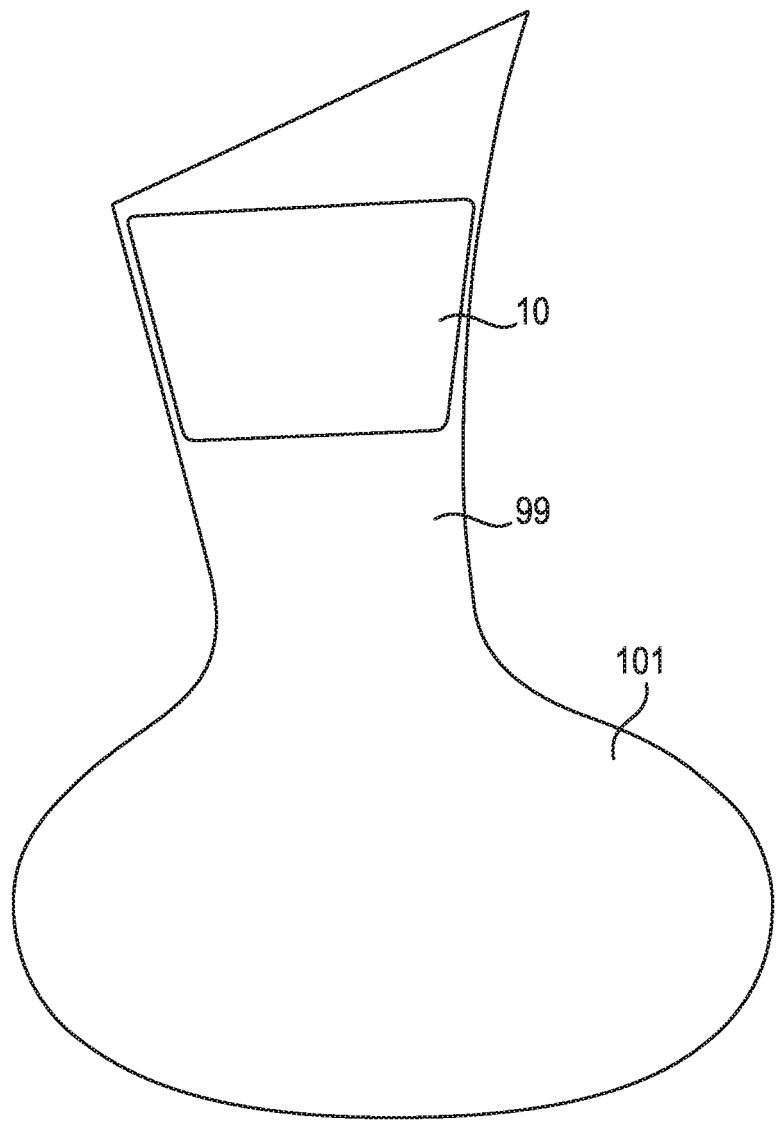
FIG. 29 is an embodiment of the assembly disposed in a carafe.

In some embodiments, such as that illustrated in FIG. 29, the assembly 10 may be disposed within a neck 99 of a carafe 101 or similar container. The assembly 10 and the carafe 101 may be a fit packaged and/or sold as a single unit While various embodiments have been described above, this disclosure is not intended to be limited thereto. Variations can be made to the disclosed embodiments that are still within the scope of the appended claims.

What is claimed is:

1. An assembly for selectively aerating a liquid, the assembly comprising:
    a base member having at least one surface that defines a reservoir adapted to receive the liquid, the base member extending along an assembly axis from a first end to a second end, the base member having at least one base aperture formed in the at least one surface defining the reservoir;
    a support member non-rotatably coupled to the base member, the support member having at least one support aperture disposed within a recess, the at least one support aperture in fluid communication with the reservoir of the base member;
    a diverter member rotatably coupled to the support member and rotatable between a first diverter position and a second diverter position, the diverter member having at least one primary aperture disposed within a trough portion, and at least one secondary aperture disposed at a first end of a channel portion; and
    an aerator member non-rotatably secured to the diverter member, the aerator member having a plurality of elongated flow features that each extends from a first end to a second end, the aeration member having an aeration aperture,
    wherein in the first diverter position, the at least one support aperture is aligned with the trough portion such that a portion of the liquid in the reservoir flows through the base aperture and into the recess of the support member and through the support aperture, into the trough portion, and through the primary aperture, and wherein the at least one primary aperture is aligned with or adjacent to a first end of a flow feature such that the portion of the liquid flowing through the primary aperture contacts at least a portion of the first end of the flow feature and flows though the aeration aperture, and
    wherein in the second diverter position, the at least one support aperture is aligned with a second end of the channel portion such that a portion of the liquid in the reservoir flows through the base aperture and into the recess of the support member and through the support aperture, into the channel portion at or adjacent to the second end, through the secondary aperture, and though the aeration aperture.

2. The assembly of claim 1, wherein a first one of the plurality of flow features extends a first distance between the first end and the second end and a second one of the plurality of flow features extends a second distance between the first end and the second end, and the first distance is greater than the second distance.

3. The assembly of claim 1, wherein the at least one support aperture of the support member is one of a plurality of support apertures, and the at least one primary aperture of the diverter member being one of a plurality of primary apertures, and wherein the trough portion of the diverter member is one of a plurality of trough portions.

4. The assembly of claim 1, wherein the at least one surface defining the reservoir of the base member is a top surface of a transverse wall, and the top surface of the transverse wall is concave.

5. The assembly of claim 4, wherein a receiving recess is formed in a bottom surface of the transverse wall of the base member, and the receiving recess is defined by a peripheral edge that is non-circular and corresponds in shape to a non-circular peripheral edge of a tab portion of the support member.

6. The assembly of claim 5, wherein the peripheral edge of the support member and the peripheral edge of the receiving recess are both hexagonal, pentagonal, or octagonal.

7. The assembly of claim 3, wherein the plurality of support apertures are uniformly arrayed about a center axis of the support member that is aligned with the assembly axis.

8. The assembly of claim 1, wherein the diverter member extends along the assembly axis from an open first end to a second end opposite the first end, and wherein the diverter member has a cylindrical upper wall that extends from the first end to an intermediate point between the first end and the second end.

9. The assembly of claim 8, wherein a top portion of the upper wall has a plurality of first engagement features disposed around a circumference of the top portion, and each of the plurality of first engagement features is adapted to releasably engage with a corresponding one of a plurality of second engagement features of the support member to removably position the diverter member in a desired position relative to the support member, and
    wherein when the diverter member is rotated relative to the support member starting from the first diverter position, one of the plurality of the first engagement features disengages with the corresponding one of the plurality of second engagement features and may rotate into engagement with another of the plurality of second engagement features such that the diverter member is disposed in the second diverter position.

10. The assembly of claim 9, wherein the another of the plurality of second engagement features is directly adjacent to the corresponding one of the plurality of second engagement features.

11. The assembly of claim 9, wherein the first engagement features are tabs with detents and the second engagement features are recesses or aperture that receive the detents on the tabs.

12. The assembly of claim 1, wherein the trough portion includes opposing side walls that surrounds the primary aperture such that liquid flowing through the support aperture when the diverter member is in the first diverter position is retained within the opposing side walls, and a bottom surface of the trough portion extends between the opposing side walls and is angled towards the primary aperture so that the liquid in the trough portion flows though the primary aperture.

13. The assembly of claim 12, wherein the opposing side walls converge as the opposing side walls extend towards the assembly axis.

14. The assembly of claim 8, wherein the secondary aperture of the diverter member is disposed at or adjacent to the second end of the diverter member.

15. The assembly of claim 14, wherein the secondary aperture is defined by an end portion of a downwardly extending spout that decreases in diameter as the spout approaches the second end of the diverter member.

16. The assembly of claim 1, wherein the aerator member extends along the assembly axis from an open first end to a second end that is opposite the first end, and the aeration aperture is disposed at the second end, and the aerator member has a parabolic cross-sectional shape when viewed normal to the assembly axis.

17. The assembly of claim 1, wherein at least one of the plurality of elongated flow features is a raised flow feature that extends from an inner surface of the aerator member, and wherein the first end of one of the plurality of flow feature is separated by a vertical distance and a circumferential distance from the second end of the one of the plurality of flow features.

18. The assembly of claim 17, wherein the second end of the one of the plurality of flow features is disposed at or adjacent to the aeration aperture.

19. An assembly for selectively aerating a liquid, the assembly comprising:
a base member having at least one surface that defines a reservoir adapted to receive the liquid, the base member extending along an assembly axis from a first end to a second end, the base member having at least one base aperture formed in the at least one surface defining the reservoir, wherein the at least one surface defining the reservoir of the base member is a top surface of a transverse wall, and the top surface of the transverse wall is concave;
a support member non-rotatably coupled to the base member, the support member having a plurality of support apertures disposed within a recess, the plurality of support apertures in fluid communication with the reservoir of the base member, wherein a receiving recess is formed in a bottom surface of the transverse wall of the base member, and the receiving recess is defined by a peripheral edge that is non-circular and corresponds in shape to a non-circular peripheral edge of a tab portion of the support member, wherein the plurality of support apertures are uniformly arrayed about a center axis of the support member that is aligned with the assembly axis;
a diverter member rotatably coupled to the support member and rotatable between a first diverter position and a second diverter position, the diverter member having at least one primary aperture disposed within a trough portion, and at least one secondary aperture disposed at a first end of a channel portion, wherein the diverter member extends along the assembly axis from an open first end to a second end opposite the first end, and wherein the diverter member has a cylindrical upper wall that extends from the first end to an intermediate point between the first end and the second end, and wherein the secondary aperture is defined by an end portion of a downwardly extending spout that decreases in diameter as the spout approaches the second end of the diverter member; and
an aerator member non-rotatably secured to the diverter member, the aerator member having a plurality of elongated flow features that each extends from a first end to a second end, the aeration member having an aeration aperture, wherein at least one of the plurality of elongated flow features is a raised flow feature that extends from an inner surface of the aerator member, and wherein the first end of one of the plurality of flow features is separated by a vertical distance and a circumferential distance from the second end of the one of the plurality of flow features,
wherein in the first diverter position, the at least one support aperture is aligned with the trough portion such that a portion of the liquid in the reservoir flows through the base aperture and into the recess of the support member and through at least one of the plurality of support apertures, into the trough portion, and through the primary aperture, and wherein the at least one primary aperture is aligned with or adjacent to a first end of a flow feature such that the portion of the liquid flowing through the primary aperture contacts at least a portion of the first end of the flow feature and flows though the aeration aperture, and
wherein in the second diverter position, the at least one of the plurality of support apertures is aligned with a second end of the channel portion such that a portion of the liquid in the reservoir flows through the base aperture and into the recess of the support member and through the at least one of the plurality of support apertures, into the channel portion at or adjacent to the second end, through the secondary aperture, and though the aeration aperture,
wherein the trough portion includes opposing side walls that surrounds the primary aperture such that liquid flowing through the support aperture when the diverter member is in the first diverter position is retained within the opposing side walls, and a bottom surface of the trough portion extends between the opposing side walls and is angled towards the primary aperture so that the liquid in the trough portion flows though the primary aperture.

20. The assembly of claim 19, wherein a top portion of the upper wall has a plurality of first engagement features disposed around a circumference of the top portion, and each of the plurality of first engagement features is adapted to releasably engage with a corresponding one of a plurality of second engagement features of the support member to removably position the diverter member in a desired position relative to the support member, and
wherein when the diverter member is rotated relative to the support member starting from the first diverter position, one of the plurality of the first engagement features disengages with the corresponding one of the plurality of second engagement features and may rotate into engagement with another of the plurality of second engagement features such that the diverter member is disposed in the second diverter position.

* * * * *

UNITED STATES PATENT AND TRADEMARK OFFICE
CERTIFICATE OF CORRECTION

PATENT NO. : 9,719,061 B2  
APPLICATION NO. : 15/074864  
DATED : August 1, 2017  
INVENTOR(S) : Kyle Buzzard et al.

Page 1 of 1

It is certified that error appears in the above-identified patent and that said Letters Patent is hereby corrected as shown below:

On the Title Page

In Item (57), under "ABSTRACT", in Column 2, Line 15, "though" should be -- through --, therefor.

In the Claims

At Column 7, Line 43, "though" should be -- through --.

At Column 7, Line 50, "though" should be -- through --.

At Column 8, Line 53, "though" should be -- through --.

At Column 10, Line 19, "though" should be -- through --.

At Column 10, Line 28, "though" should be -- through --.

At Column 10, Line 37, "though" should be -- through --.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*